United States Patent
Haga et al.

(10) Patent No.: US 8,284,843 B2
(45) Date of Patent: Oct. 9, 2012

(54) INFORMATION ENCODING APPARATUS AND METHOD, INFORMATION SEARCHING APPARATUS AND METHOD, INFORMATION SEARCHING SYSTEM AND METHOD, AND PROGRAM THEREFOR

(75) Inventors: Tsugihiko Haga, Tokyo (JP); Hideo Nakaya, Kanagawa (JP); Takashi Horishi, Tokyo (JP); Ryosuke Araki, Tokyo (JP); Seiichi Inomata, Tokyo (JP); Takuro Kawai, Tokyo (JP); Toshiyuki Hino, Tokyo (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1021 days.

(21) Appl. No.: 12/255,108

(22) Filed: Oct. 21, 2008

(65) Prior Publication Data

US 2009/0110079 A1   Apr. 30, 2009

(30) Foreign Application Priority Data

Oct. 29, 2007   (JP) ................................ 2007-281029

(51) Int. Cl.
G06K 9/46 (2006.01)
(52) U.S. Cl. .............. 375/240.24; 375/240.26; 382/236; 382/239
(58) Field of Classification Search .................... None
See application file for complete search history.

(56) References Cited

U.S. PATENT DOCUMENTS

| 7,236,634 B2 * | 6/2007 | Miyakoshi et al. ........... 382/236 |
| 7,738,716 B2 * | 6/2010 | Song ............................. 382/239 |
| 8,023,569 B2 * | 9/2011 | Sun .......................... 375/240.26 |

FOREIGN PATENT DOCUMENTS

| JP | 7-271954 | 10/1995 |
| JP | 8-79537 | 3/1996 |
| JP | 11-312173 | 11/1999 |
| JP | 2001-52010 | 2/2001 |

OTHER PUBLICATIONS

Office Action issued Aug. 30, 2011, in Japanese Patent Application No. 2007-281029.

* cited by examiner

*Primary Examiner* — Kaveh Abrishamkar
(74) *Attorney, Agent, or Firm* — Oblon, Spivak, McClelland, Maier & Neustadt, L.L.P.

(57) ABSTRACT

An information searching system includes an encoding apparatus and a searching apparatus. The encoding apparatus inputs information to be stored, encodes the input information in layers, and then stores the resulting per-layer encoding information in a database. The searching apparatus acquires information that has been thus encoded in layers in order from the upper layers thereof, compares the encoded information for an acquired search query to the encoded information for potential matches on a per-layer basis, decodes the information for the potential matches that resemble the search query on the basis of the comparison results, and then outputs the decoded information for the potential matches that resemble the search query. In so doing, searches are conducted rapidly and with reduced computational load.

21 Claims, 21 Drawing Sheets

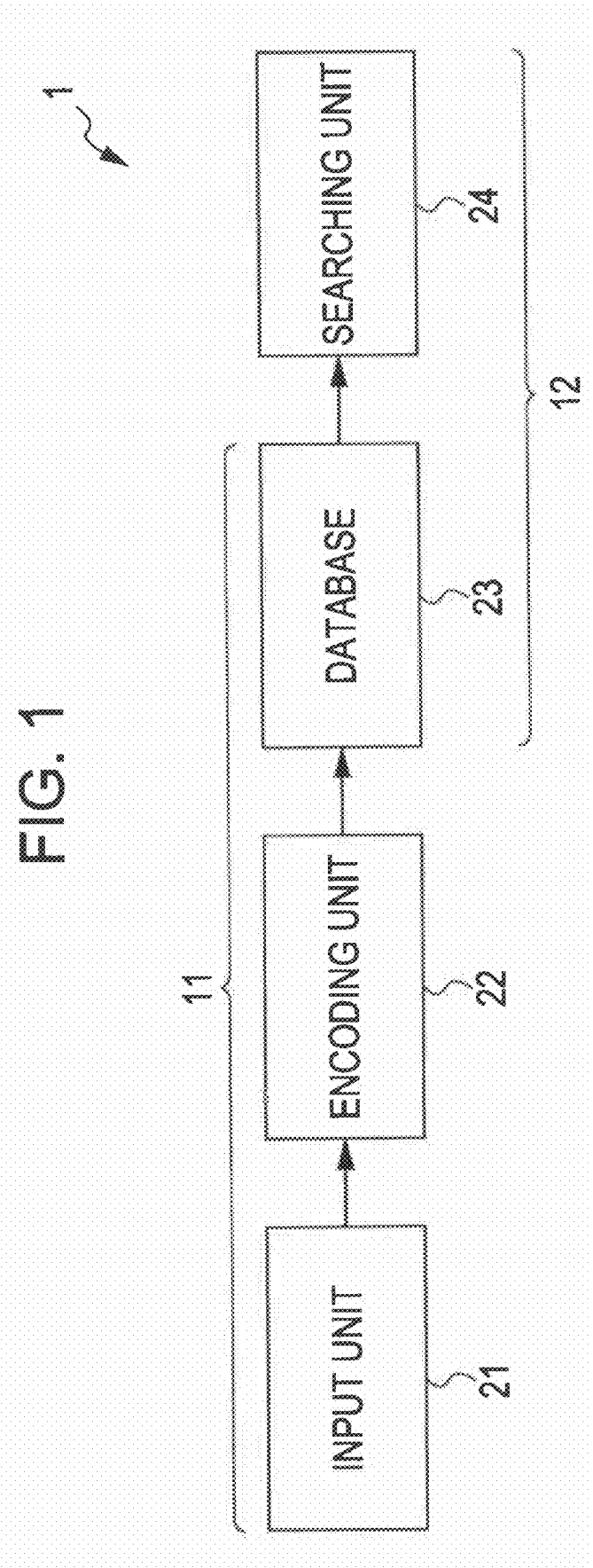

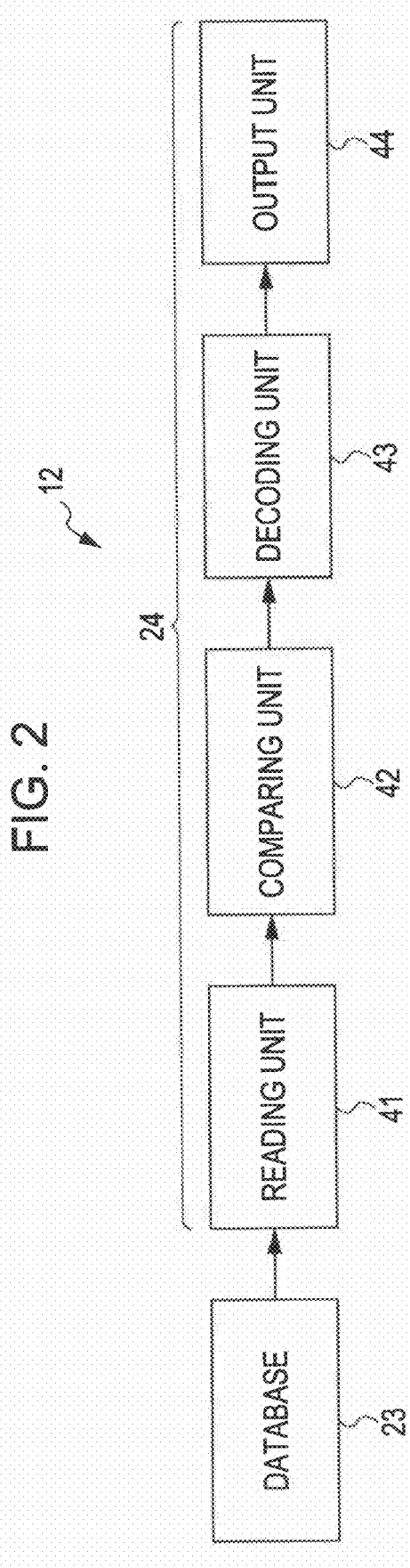

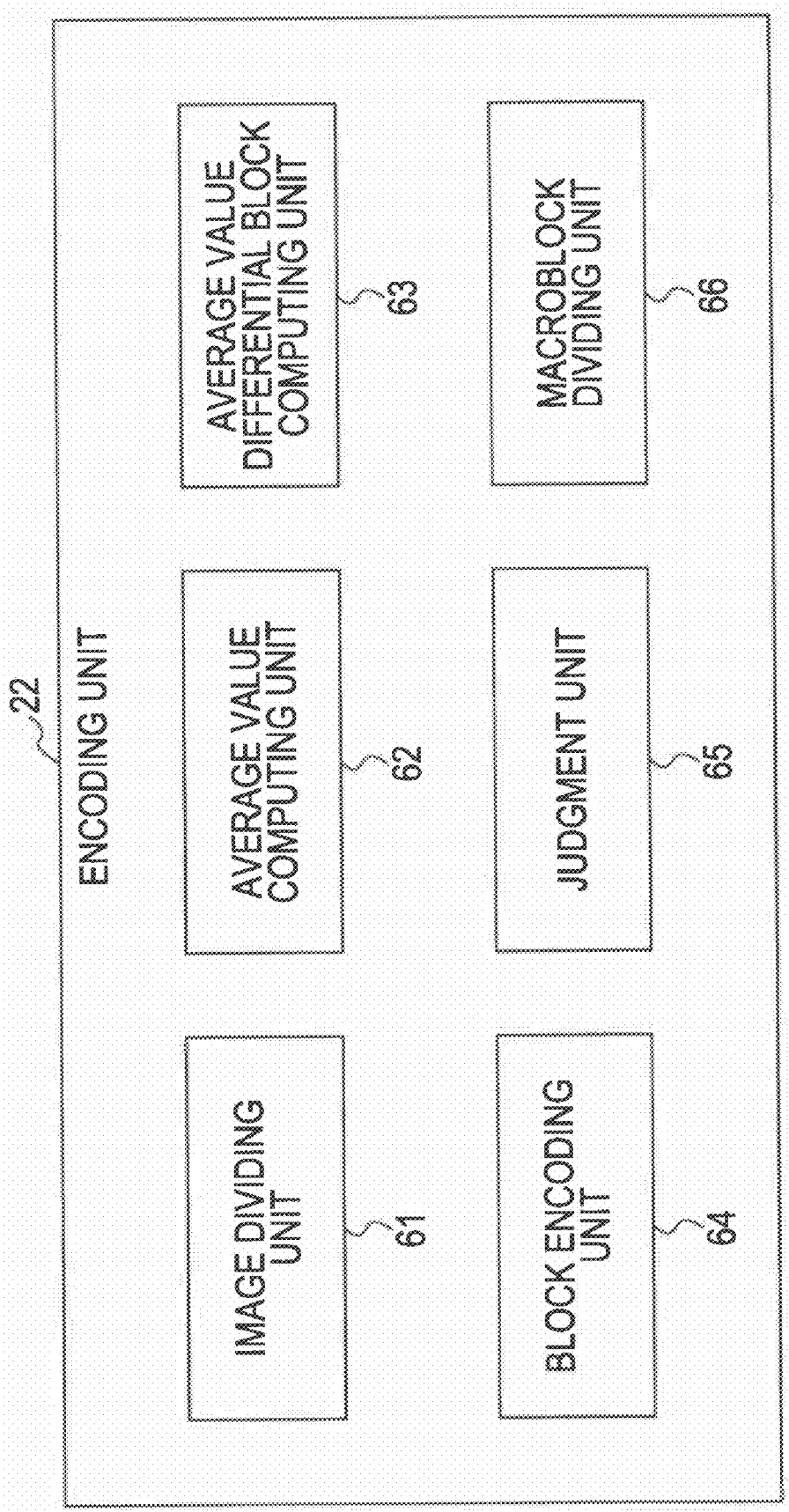

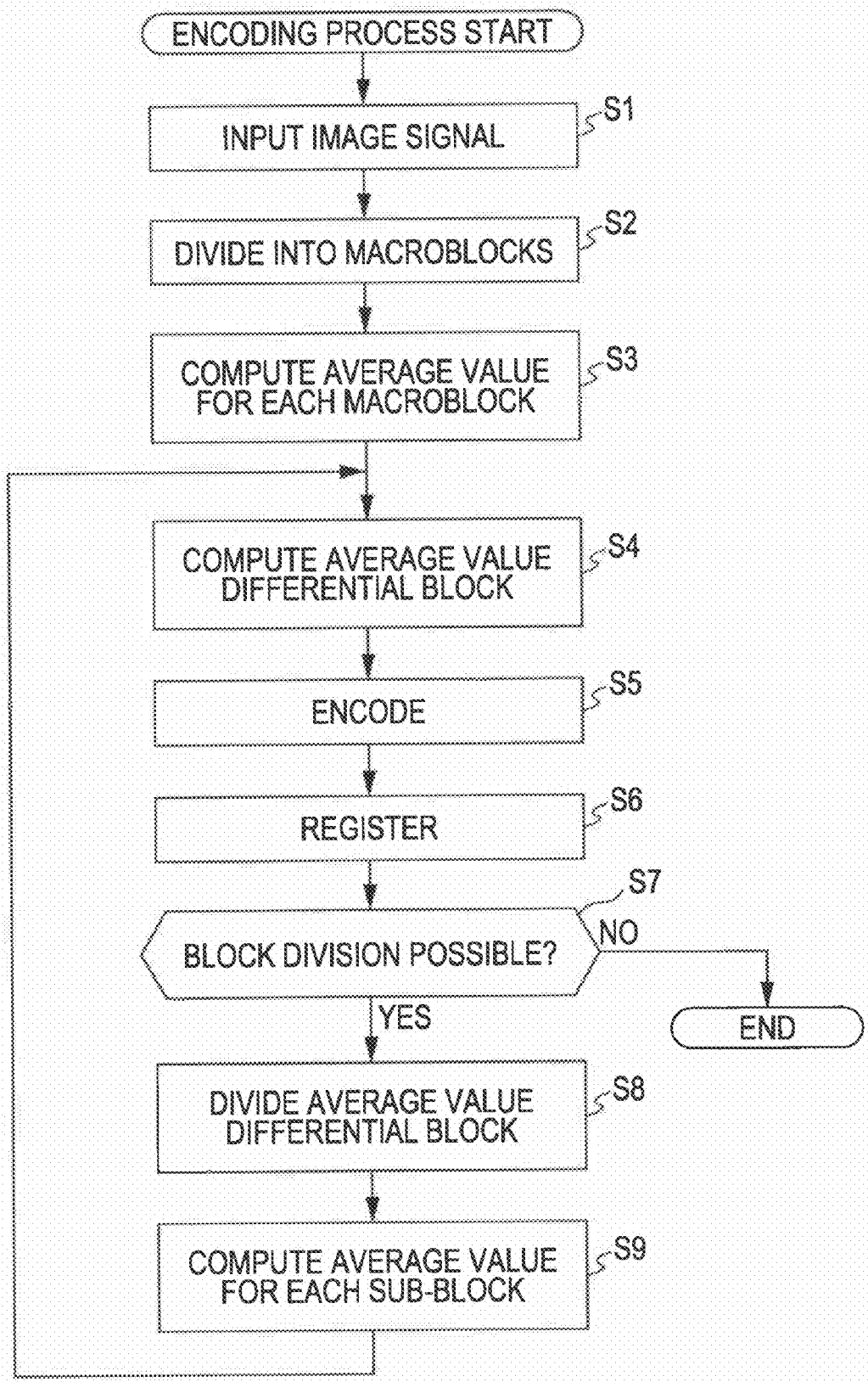

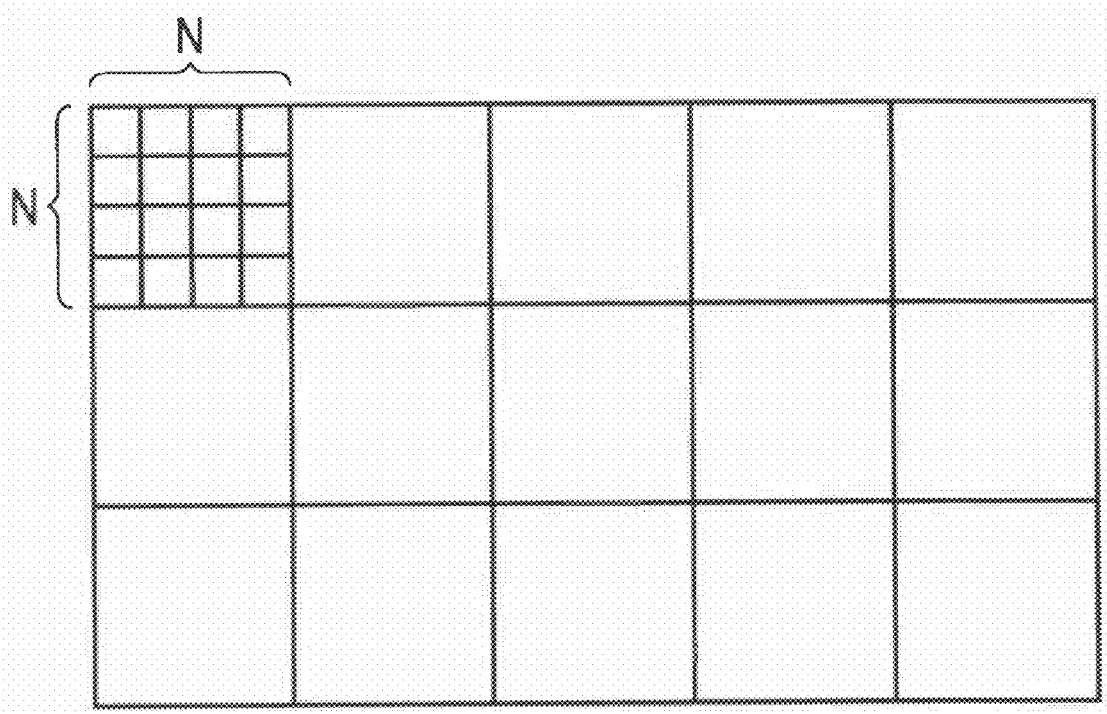

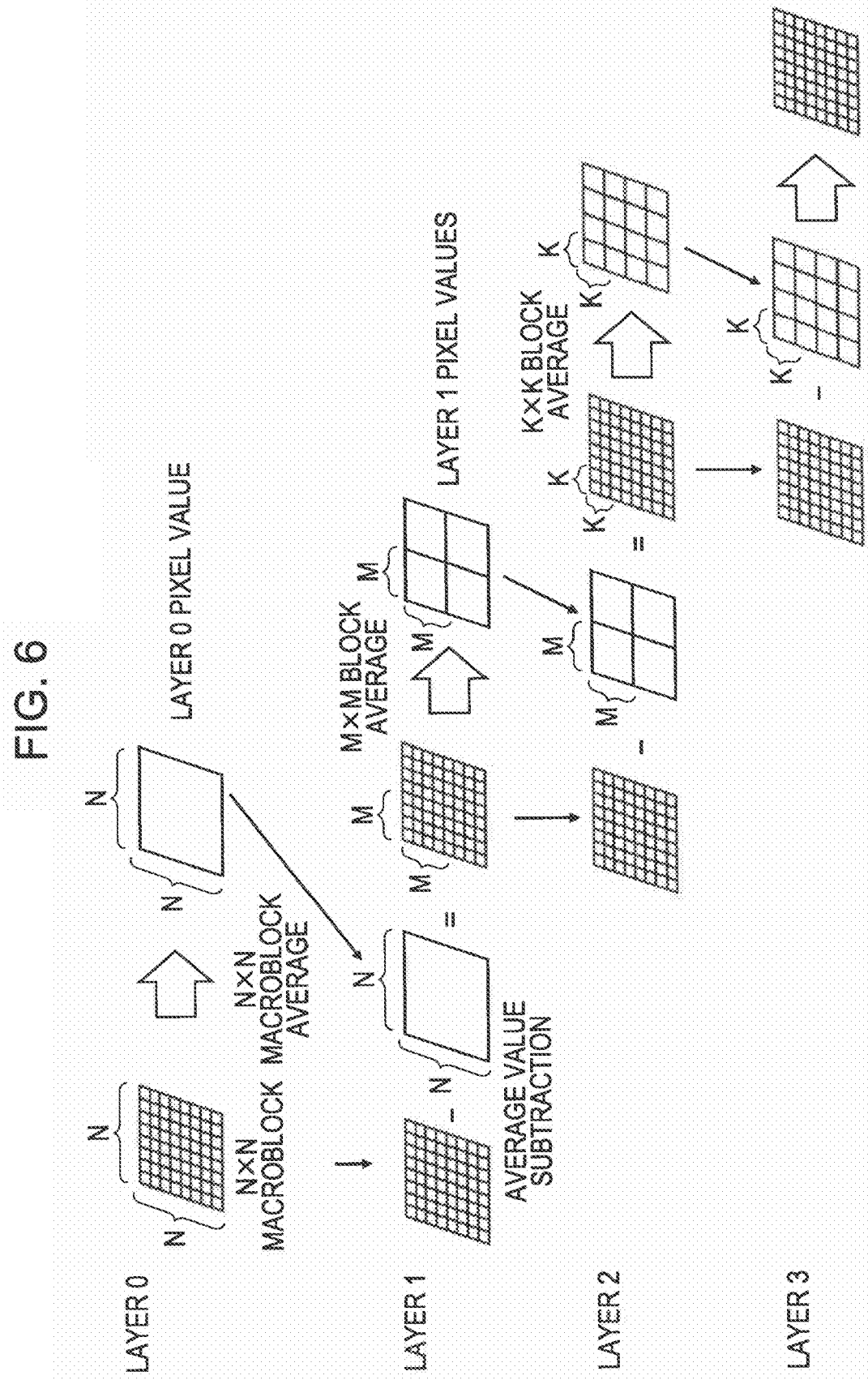

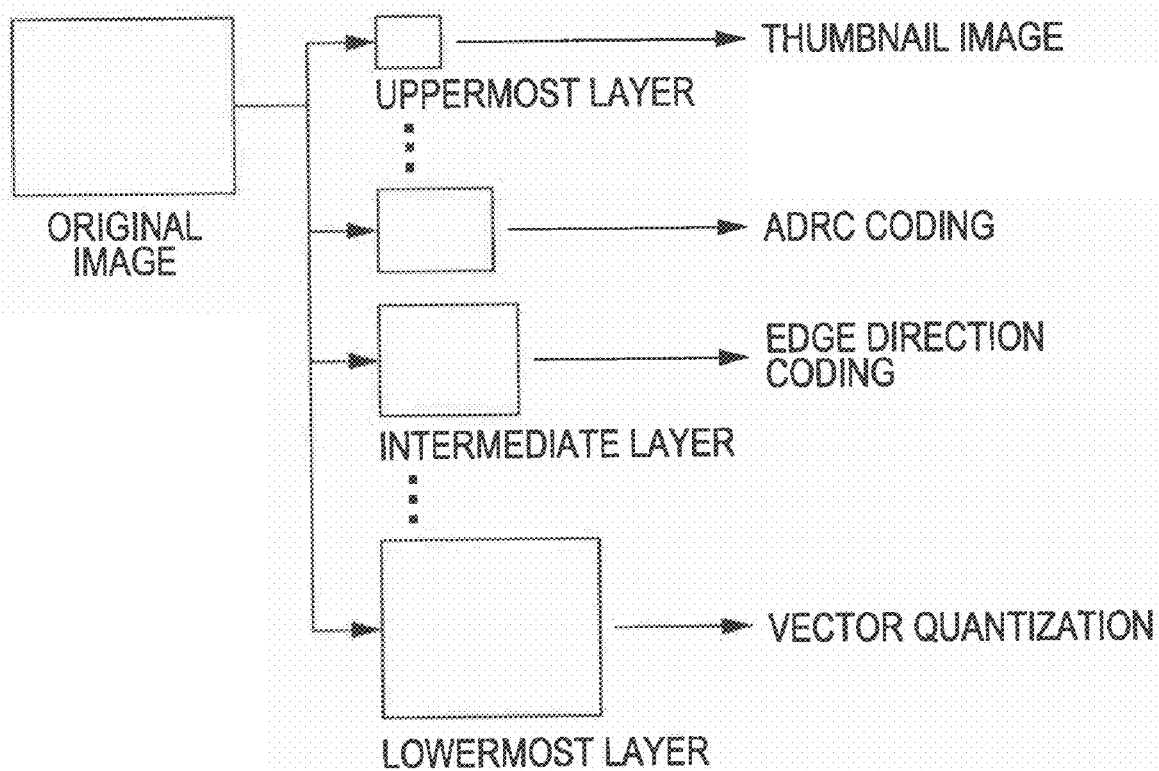

| LAYER | ENCODING SCHEME |
|---|---|
| 0 (UPPERMOST) | THUMBNAIL |
| 1 | EDGE DIRECTION CODING |
| 2 (LOWERMOST) | VECTOR QUANTIZATION |

FIG. 15

| EDGE DIRECTION | NONE | 0° | 22.5° | 45° | 67.5° | 90° | 112.5° | 135° | 157.5° |
|---|---|---|---|---|---|---|---|---|---|
| CODE VALUE | 0 | 1 | 2 | 3 | 4 | 5 | 6 | 7 | 8 |

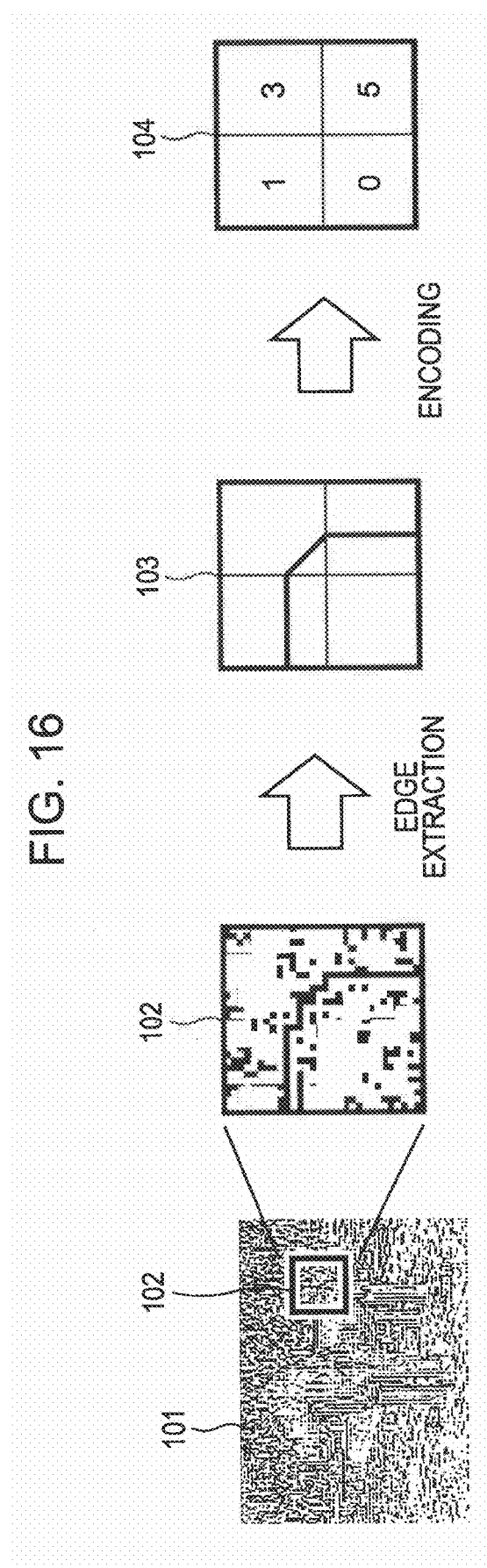

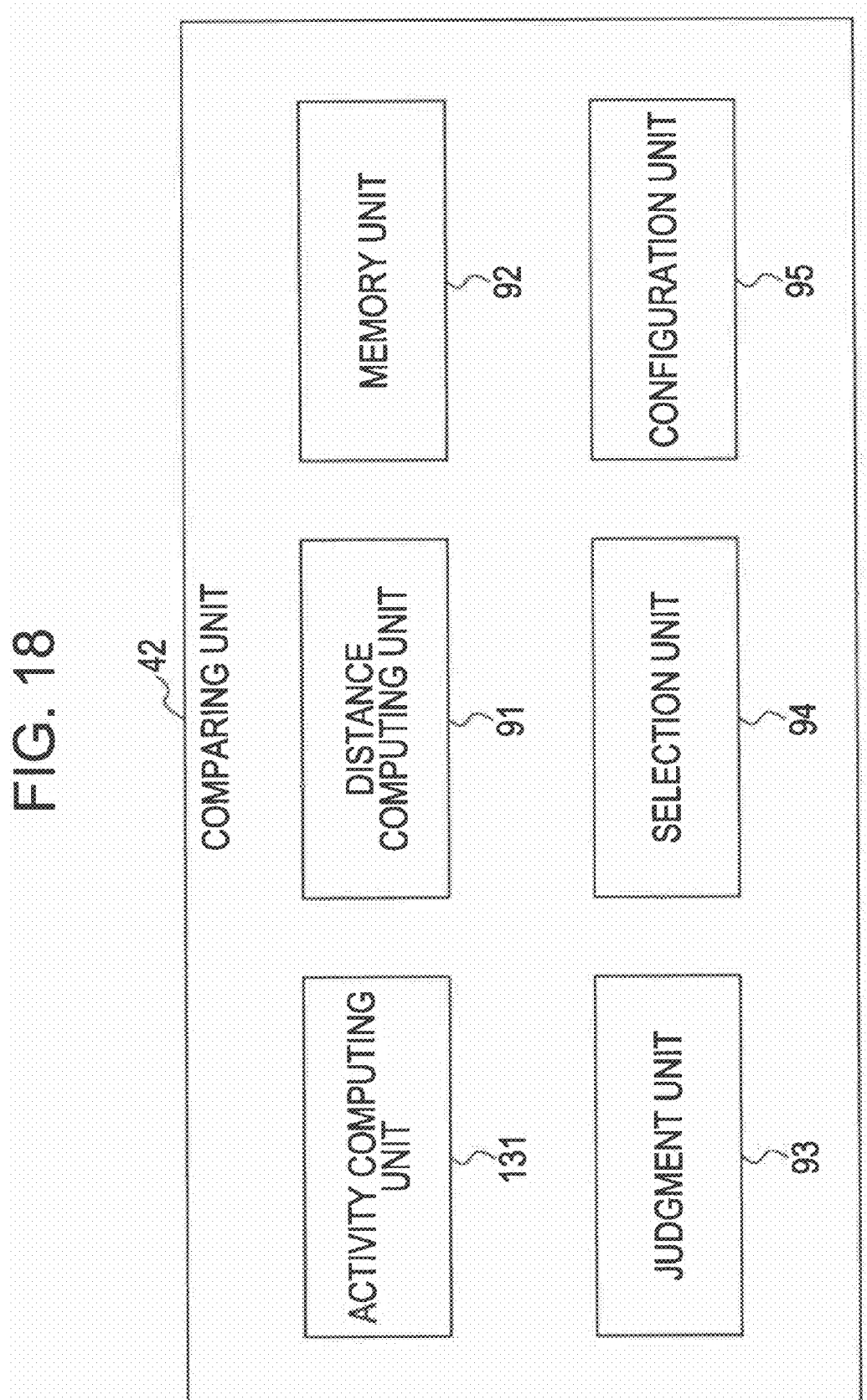

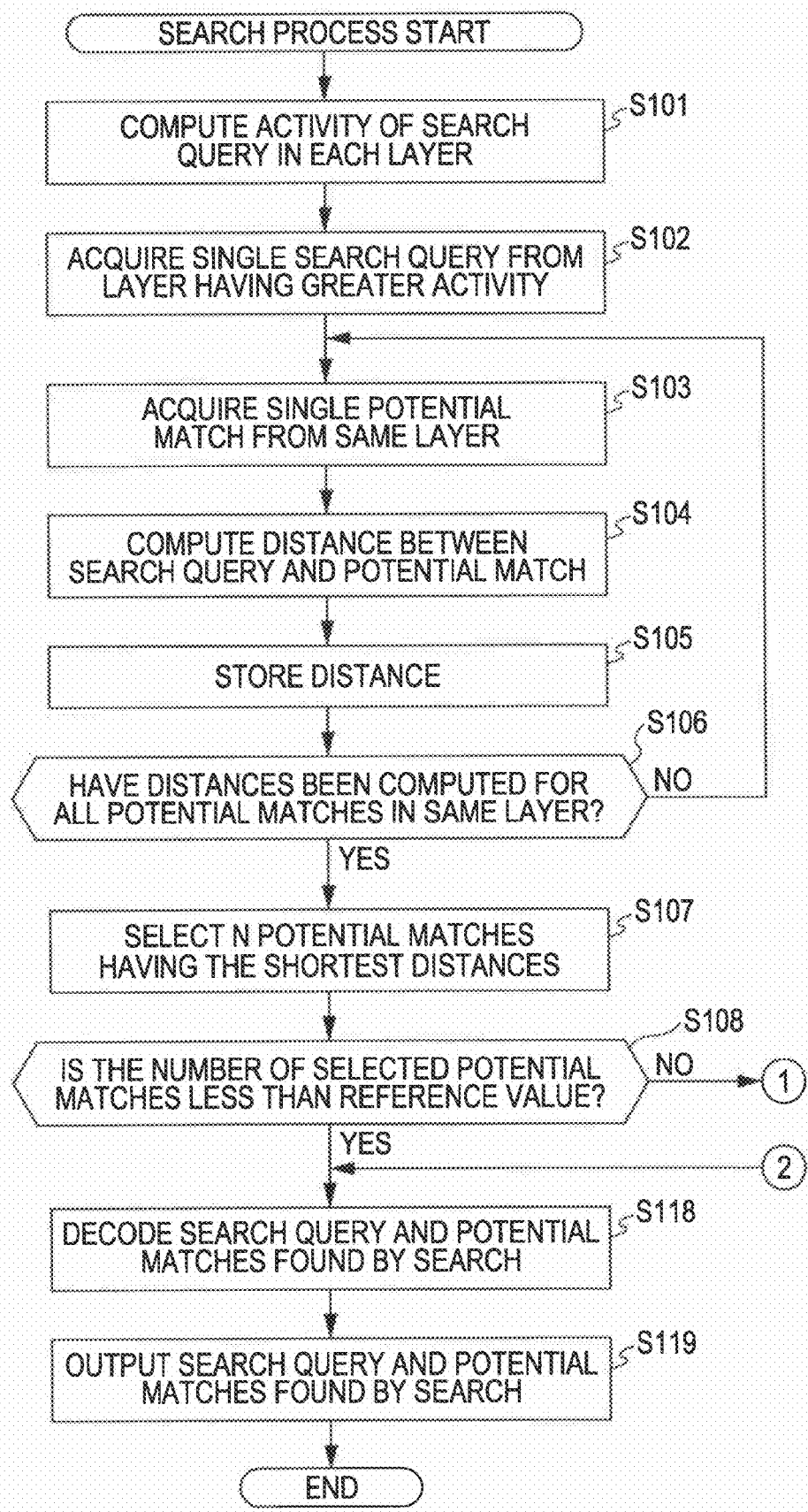

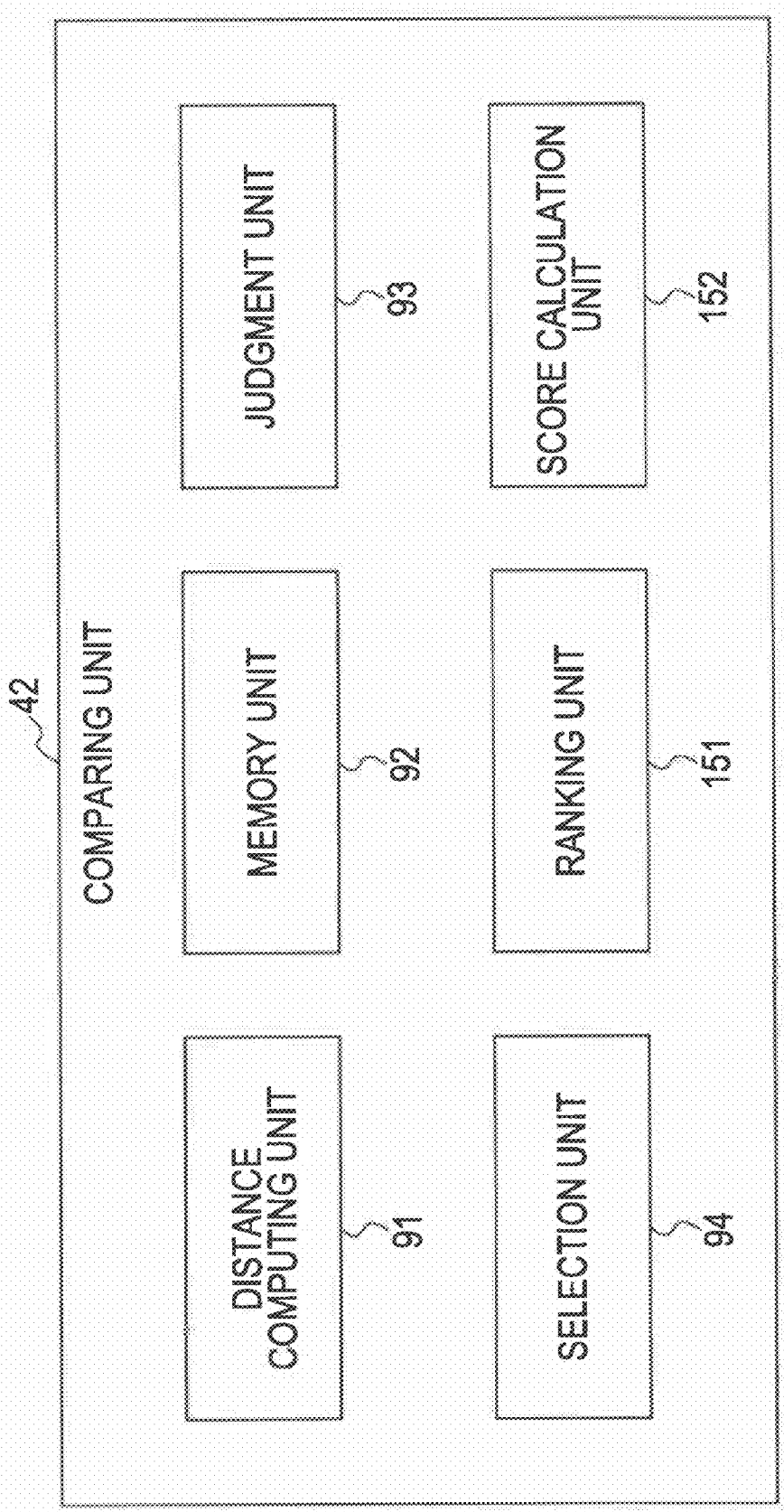

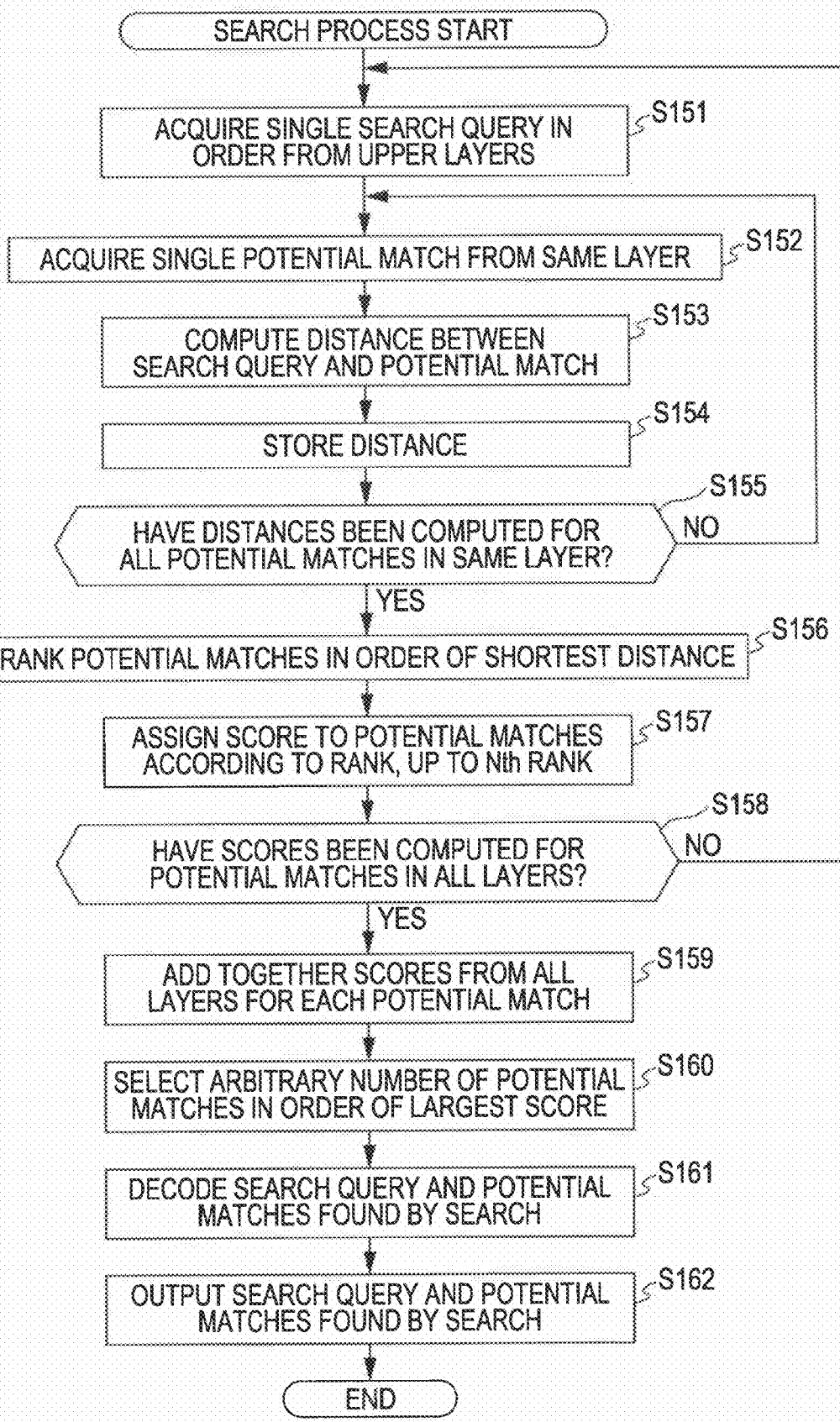

INFORMATION ENCODING APPARATUS AND METHOD, INFORMATION SEARCHING APPARATUS AND METHOD, INFORMATION SEARCHING SYSTEM AND METHOD, AND PROGRAM THEREFOR

CROSS REFERENCES TO RELATED APPLICATIONS

The present invention contains subject matter related to Japanese Patent Application JP 2007-281029 filed in the Japanese Patent Office on Oct. 29, 2007, the entire contents of which are incorporated herein by reference.

BACKGROUND OF THE INVENTION

1. Field of the Invention

The present invention relates to an information encoding apparatus and method, an information searching apparatus and method, an information searching system and method, as well as a program therefor. More particularly, the present invention relates to an information encoding apparatus and method, an information searching apparatus and method, an information searching system and method, and a program able conduct searches rapidly and with reduced computational load.

2. Description of the Related Art

The preparation in advance of an image at a plurality of resolutions is disclosed in JP-A-H11-312173, for example. In so doing, an image can be rapidly displayed at a desired resolution.

SUMMARY OF THE INVENTION

Meanwhile, adoption of broadband networking and increased storage capacity has given rise to demand for a technique whereby information, particularly image information, can be efficiently organized.

However, if an image at a plurality of resolutions is saved in a database, then the amount of saved data increases by an equivalent amount. As a result, computational load also increases when searching for a desired image, and thus rapid image searching becomes difficult.

The present invention, being devised in light of the above circumstances, is able to rapidly conduct a search by reducing the computational load involved during a search.

One embodiment of the present invention is an information encoding apparatus provided with an input unit that inputs information to be saved, an encoding unit that encodes the input information in layers, and a database that stores per-layer encoded information.

The encoding unit may be configured to divide the information into macroblocks, compute an average value for each sub-block constituting a particular macroblock, compute an average value differential block by subtracting the computed average values from the corresponding macroblock, and then encode the resulting average value differential block.

The encoding unit may also be configured to encode the information using a different encoding scheme for each layer.

The information herein may be image information. In such a case, the encoding unit may be configured to generate a thumbnail image as the uppermost layer of the image information.

Another embodiment of the present invention is an information encoding method whereby an input unit inputs information to be saved, an encoding unit encodes the input information in layers, and a database stores per-layer encoded information.

Another embodiment of the present invention is a program that causes a computer to execute processing to input information to be saved, encode the input information in layers, and then store the per-layer encoded information.

Another embodiment of the present invention is an information encoding apparatus provided with: a dividing unit that divides a macroblock into a plurality of sub-blocks having a predetermined size, the macroblock being one of a plurality of macroblocks obtained by dividing original information thereinto; an average value computing unit that computes an average value for each sub-block constituting a particular macroblock; an average value differential block computing unit that computes an average value differential block by subtracting the computed average values from the corresponding macroblock; and an encoding unit that encodes average value differential blocks for each of a plurality of layers computed by repeatedly dividing each macroblock into smaller sub-blocks.

The average value computing unit may also be configured to additionally compute an average value for each of the plurality of macroblocks themselves, while the encoding unit may be configured to take the average value information of the macroblocks themselves as the information in the uppermost layer without encoding the average value information.

A database that stores the per-layer information may also be provided.

Another embodiment of the present invention is an information encoding method whereby the following is conducted. A dividing unit divides a macroblock into a plurality of sub-blocks having a predetermined size, the macroblock being one of a plurality of macroblocks obtained by dividing original information thereinto. An average value computing unit computes an average value for each sub-block constituting a particular macroblock. An average value differential block computing unit computes an average value differential block by subtracting the computed average values from the corresponding macroblock. An encoding unit then encodes average value differential blocks for each of a plurality of layers computed by repeatedly dividing each macroblock into smaller sub-blocks.

Another embodiment of the present invention is a program that causes a computer to execute processing to: divide a macroblock into a plurality of sub-blocks having a predetermined size, the macroblock being one of a plurality of macroblocks obtained by dividing original information thereinto; compute an average value for each sub-block constituting a particular macroblock; compute an average value differential block by subtracting the computed average values from the corresponding macroblock; and then encode average value differential blocks for each of a plurality of layers computed by repeatedly dividing each macroblock into smaller sub-blocks.

Another embodiment of the present invention is an information searching apparatus provided with: an acquiring unit that acquires information that has been encoded in layers in order from the upper layers thereof; a comparing unit that compares the encoded information for an acquired search query to the encoded information for potential matches on a per-layer basis; a decoding unit that, on the basis of the comparison results, decodes the information for the potential matches that resemble the search query; and an output unit that outputs the decoded information for the potential matches that resemble the search query.

The comparing unit may also be configured to compute the distance between the encoded information for a search query and the encoded information for a potential match.

The comparing unit may also be configured to compare the search query information to potential match information at successively lower layers, wherein the potential matches being compared to the search query information have been determined in an upper layer to have a shorter distance to the search query.

The comparing unit may also be configured to conduct comparisons on a per-layer basis in order of the layers having the greatest amount of activity in the search query.

The comparing unit may also be configured to search for potential match information that resembles the search query on the basis of scores assigned in each layer according to the distance with respect to the search query information in that layer.

Another embodiment of the present invention is an information searching method whereby the following is conducted. An acquiring unit acquires information that has been encoded in layers in order from the upper layers thereof. A comparing unit compares the encoded information for an acquired search query to the encoded information for potential matches on a per-layer basis. On the basis of the comparison result, a decoding unit decodes the potential match information for the potential matches that resemble the search query. An output unit then outputs the decoded information for the potential matches that resemble the search query.

Another embodiment of the present invention is a program that causes a computer to execute processing to: acquire information that has been encoded in layers in order from the upper layers thereof; compare the encoded information for an acquired search query to the encoded information for potential matches on a per-layer basis; on the basis of the comparison result, decode the potential match information for the potential matches that resemble the search query; and output the decoded information for the potential matches that resemble the search query.

Another embodiment of the present invention is an information searching system provided with the following. A dividing unit divides a macroblock into a plurality of sub-blocks having a predetermined size, the macroblock being one of a plurality of macroblocks obtained by dividing original information thereinto. An average value computing unit computes an average value for each sub-block constituting a particular macroblock. An average value differential block computing unit computes an average value differential block by subtracting the computed average values from the corresponding macroblock. An encoding unit encodes average value differential blocks for each of a plurality of layers computed by repeatedly dividing each macroblock into smaller sub-blocks. An acquiring unit acquires information that has been thus encoded in layers in order from the upper layers thereof. A comparing unit compares the encoded information for an acquired search query to the encoded information for potential matches on a per-layer basis. On the basis of the comparison result, a decoding unit decodes the information for the potential matches that resemble the search query. An output unit then outputs the decoded information for the potential matches that resemble the search query.

Another embodiment of the present invention is an information searching method whereby the following is conducted. A dividing unit divides a macroblock into a plurality of sub-blocks having a predetermined size, the macroblock being one of a plurality of macroblocks obtained by dividing original information thereinto. An average value computing unit computes an average value for each sub-block constituting a particular macroblock. An average value differential block computing unit computes an average value differential block by subtracting the computed average values from the corresponding macroblock. An encoding unit encodes average value differential blocks for each of a plurality of layers computed by repeatedly dividing each macroblock into smaller sub-blocks. An acquiring unit acquires information that has been thus encoded in layers in order from the upper layers thereof. A comparing unit compares the encoded information for an acquired search query to the encoded information for potential matches on a per-layer basis. On the basis of the comparison result, a decoding unit decodes the information for the potential matches that resemble the search query. An output unit then outputs the decoded information for the potential matches that resemble the search query.

Another embodiment of the present invention is a program that causes a computer to execute processing to: divide a macroblock into a plurality of sub-blocks having a predetermined size, the macroblock being one of a plurality of macroblocks obtained by dividing original information thereinto; compute an average value for each sub-block constituting a particular macroblock; compute an average value differential block by subtracting the computed average values from the corresponding macroblock; encode average value differential blocks for each of a plurality of layers computed by repeatedly dividing each macroblock into smaller sub-blocks; acquire information that has been thus encoded in layers in order from the upper layers thereof; compare the encoded information for an acquired search query to the encoded information for potential matches on a per-layer basis; on the basis of the comparison result, decode the information for the potential matches that resemble the search query; and output the decoded information for the potential matches that resemble the search query.

Another embodiment of the present invention is configured such that: an input unit inputs information to be stored; an encoding unit encodes the input information in layers; and a database stores the resulting per-layer encoded information.

Another embodiment of the present invention is configured such that: a dividing unit divides a macroblock into a plurality of sub-blocks having a predetermined size, the macroblock being one of a plurality of macroblocks obtained by dividing original information thereinto; an average value computing unit computes an average value for each sub-block constituting a particular macroblock; an average value differential block computing unit computes an average value differential block by subtracting the computed average values from the corresponding macroblock; and an encoding unit encodes average value differential blocks for each of a plurality of layers computed by repeatedly dividing each macroblock into smaller sub-blocks.

Another embodiment of the present invention is configured such that: an acquiring unit acquires information that has been encoded in layers in order from the upper layers thereof; a comparing unit compares the encoded information for an acquired search query to the encoded information for potential matches on a per-layer basis; on the basis of the comparison result, a decoding unit decodes the information for the potential matches that resemble the search query; and an output unit then outputs the decoded information for the potential matches that resemble the search query.

Another embodiment of the present invention is configured such that: a dividing unit divides a macroblock into a plurality of sub-blocks having a predetermined size, the macroblock being one of a plurality of macroblocks obtained by dividing original information thereinto; an average value computing unit computes an average value for each sub-block constituting a particular macroblock; an average value differential block computing unit computes an average value differential block by subtracting the computed average values from the corresponding macroblock; an encoding unit encodes average value differential blocks for each of a plurality of layers computed by repeatedly dividing each macroblock into smaller sub-blocks; an acquiring unit acquires information that has been thus encoded in layers in order from the upper layers thereof; a comparing unit compares the encoded information for an acquired search query to the encoded information for potential matches on a per-layer basis; on the basis of the comparison result, a decoding unit decodes the information for the potential matches that resemble the search query; and an output unit then outputs the decoded information for the potential matches that resemble the search query.

As described above, according to an embodiment of the present invention, rapid searching is enabled wherein the computational load imposed during a search is reduced.

BRIEF DESCRIPTION OF THE DRAWINGS

FIG. 1 is a block diagram illustrating the configuration of an information searching system in accordance with an embodiment of the present invention;

FIG. 2 is a block diagram illustrating the configuration of an information searching apparatus;

FIG. 3 is a block diagram illustrating the functional configuration of an encoding unit;

FIG. 4 is a flowchart explaining an encoding process;

FIG. 5 is a diagram explaining macroblocks;

FIG. 6 is a diagram explaining layering;

FIG. 9 is a diagram explaining per-layer encoding;

FIG. 15 is a diagram explaining edge direction coding;

FIG. 16 is a diagram explaining encoding by means of edge direction coding;

FIG. 18 is a block diagram illustrating the functional configuration of a comparing unit;

FIG. 19 is a flowchart explaining a search process;

FIG. 21 is a block diagram illustrating the functional configuration of a comparing unit; and FIG. 22 is a flowchart explaining a search process.

DESCRIPTION OF THE PREFERRED EMBODIMENTS

Figure 7A:
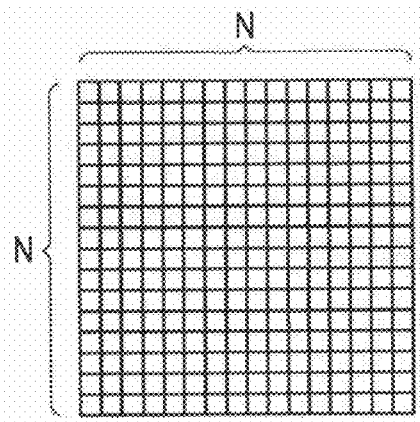
FIG. 7 is a diagram explaining macroblock division.
Figure 7B:
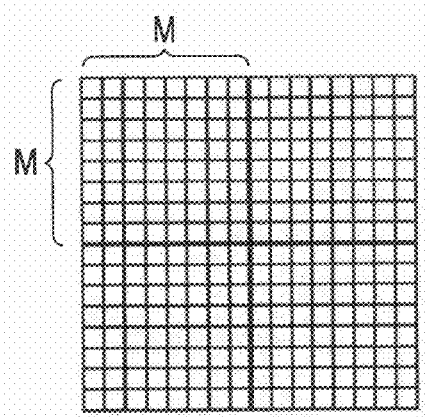
Figure 7C:
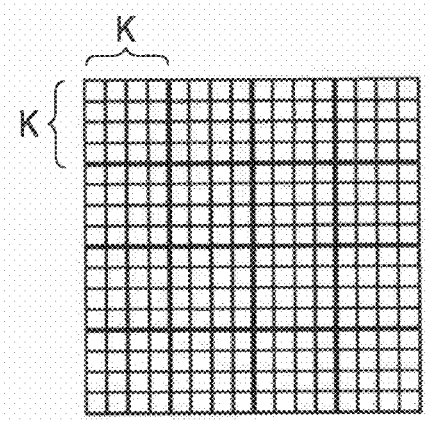
Figure 7D:
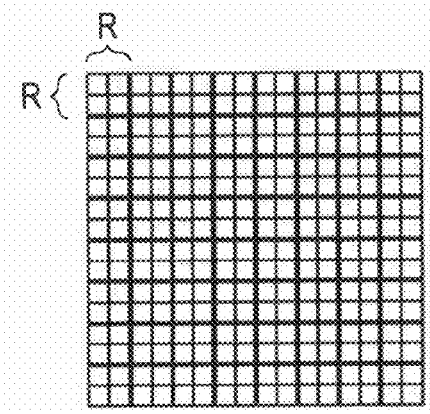

Hereinafter, embodiments of the present invention will be described with reference to the accompanying drawings.

FIG. 1 illustrates the configuration of an information searching system in accordance with an embodiment of the present invention. The information searching system 1 is provided with an information encoding apparatus 11 and an information searching apparatus 12.

The information encoding apparatus 11 includes an input unit 21, an encoding unit 22, and a database 23. The information searching apparatus 12 includes the database 23 and a searching unit 24.

The input unit 24 inputs information to be stored into the database 23 via a recording medium (not shown in the drawings) or one or more various networks as typified by the Internet. In the case of the present embodiment, image information is input. The encoding unit 22 encodes the input information in layers. The database 23 stores the per-layer encoded information. The searching unit 24 searches for potential match information stored in the database 23 that resembles (or is identical to) search query information.

FIG. 2 illustrates the configuration of an embodiment of a searching unit 24 in an information searching apparatus 12. The searching unit 24 is configured to include a reading unit 41, a comparing unit 42, a decoding unit 43, and an output unit 44.

The reading unit 41 reads out search query information and potential match information stored in the database 23. The comparing unit 42 compares the retrieved search query information and potential match information. The decoding unit 43 decodes the search query information, the comparison result, and the potential match information that was determined to resemble the search query information. The decoding unit 43 decodes using a decoding scheme that corresponds to the encoding scheme of the encoding unit 22. The output unit 44 is configured to include components such as an LCD (liquid crystal display) and one or more speakers, for example, and outputs the information that has been found by search and decoded.

The encoding process of the information encoding apparatus 11 will now be described with reference to the flowchart in FIG. 4. In order to conduct this process, the encoding unit 22 has a functional configuration like that shown in FIG. 3.

More specifically, the encoding unit 22 includes an image dividing unit 61, an average value computing unit 62, an average value differential block computing unit 63, a block encoding unit 64, a judgment unit 65, and a macroblock dividing unit 66.

The image dividing unit 61 divides a single image into a plurality of macroblocks. The average value computing unit 62 computes an average value for each macroblock as well as for each sub-block constituting a macroblock. The average value differential block computing unit 63 computes an average value differential block wherein the average values of the sub-blocks constituting a given macroblock have been subtracted from that macroblock. The block encoding unit 64 encodes average value differential blocks on a per-layer basis. The judgment unit 65 makes various judgments. The macroblock dividing unit 66 sequentially divides a macroblock into sub-blocks having a predetermined size.

The encoding process of the information encoding apparatus 11 will now be described with reference to the flowchart in FIG. 4.

In step S1, the input unit 21 inputs an image signal to be stored in the database 23. In step S2, the image dividing unit 61 of the encoding unit 22 divides the image represented by the input image signal into macroblocks. For example, a single image may be divided into a plurality of macroblocks as shown in FIG. 5. Each macroblock contains N×N pixels.

In step S3, the average value computing unit 62 computes an average value for each macroblock. More specifically, an average value is computed for each group of N×N pixels that respectively constitutes a single macroblock, as shown in Layer 0 of FIG. 6. Subsequently, the image expressed by the set of average values for each group of N×N pixels that respectively constitutes a macroblock is taken to be the image for the uppermost layer (i.e., Layer 0). This image is used as a thumbnail image, and thus is not encoded.

In step S4, the average value differential block computing unit 63 computes an average value differential block. More specifically, the average value of all of the pixels in a macroblock is respectively subtracted from each pixel value in the macroblock, as shown in Layer 1 of FIG. 6. The result is taken to be an average value differential block for that layer (i.e., Layer 1).

In step S5, the block encoding unit 64 encodes the average value differential block. In the example shown in FIG. 6, the average value differential block for Layer 1 is encoded. The encoding scheme implemented at this point is taken to be ADRC (Adaptive Dynamic Range Coding), for example. In step S6, the database 23 registers the average value differential block that was encoded in step S5. In the example shown in FIG. 6, the average value differential block for Layer 1 is registered.

In step S7, the judgment unit 65 determines whether or not further block division is possible. In the case of the present embodiment, an N×N pixel macroblock is successively divided into M×M pixel sub-blocks (totaling (N/M)×(N/M) sub-blocks), K×K pixel sub-blocks (totaling (N/K)×(N/K) sub-blocks), and R×R pixel sub-blocks (totaling (N/R)×(N/R) sub-blocks). In the example shown in FIG. 7, the following values for N are assumed: N=16, M=8, K=4, R=2. In other words, a given macroblock is divided such that the sub-block size is halved with each successive division. In this case, the judgment unit 65 determines that further division is to be terminated when a 2×2 pixel sub-block is divided, or alternatively, when a sub-block containing an odd number of pixels is divided.

Of course, it is also possible to divide a macroblock into sub-blocks whose size is reduced to ⅓, ¼, ⅕, or another fraction of the initial macroblock size with each successive division.

When further block division is possible, the macroblock dividing unit 66 divides the average value differential block in step S8. In the example shown in FIG. 6, the average value differential block in Layer 1 is divided into a plurality of M×M pixel sub-blocks. In step S9, the average value computing unit 62 computes an average value for each sub-block. In the example shown in FIG. 6, the M×M pixels in each sub-block are respectively averaged.

Subsequently, the process returns to step S4, and the average value differential block computing unit 63 computes an average value differential block. As illustrated in Layer 2 of the example shown in FIG. 6, the average values computed in step S9 are respectively subtracted from the pixel values contained in the average value differential block of the next highest layer (i.e., Layer 1). The result is then taken to be the average value differential block for Layer 2.

In step S5, the block encoding unit 64 encodes the average value differential block for Layer 2. The encoding scheme used at this point is different from the scheme used for Layer 1, such as an edge direction encoding scheme. In step S6, the database 23 registers the average value differential block that was encoded in step S5. In the example shown in FIG. 6, the average value differential block for Layer 2 is registered.

If it is determined in step S7 that further block division is possible, then the macroblock dividing unit 66 divides the average value differential block in step S8. In the example shown in FIG. 6, the average value differential block for Layer 2 is divided into a plurality of K×K pixel sub-blocks. In step S9, the average value computing unit 62 computes an average value for each sub-block. In the example shown in FIG. 6, the K×K pixels in each sub-block are respectively averaged.

Subsequently, the process returns to step S4, and the average value differential block computing unit 63 computes an average value differential block. As illustrated in Layer 3 of the example shown in FIG. 6, the average values computed in step S9 are respectively subtracted from the pixel values contained in the average value differential block of the next highest layer (i.e., Layer 2). The result is then taken to be the average value differential block for Layer 3.

In step S5, the block encoding unit 64 encodes the average value differential block for Layer 3. The encoding scheme used at this point is different from the schemes used for Layers 1 and 2, such as a vector quantization encoding scheme. In step S6, the database 23 registers the average value differential block that was encoded in step S5. In the example shown in FIG. 6, the average value differential block for Layer 3 is registered.

The above process is repeated until it is determined in step S7 that block division is to be terminated. If it is determined that further block division is to be terminated, then the process is terminated.

As described above, in the present embodiment, an original image is encoded in layers, and per-layer encoded data is registered therefor.

FIGS. 8A to 8D illustrate specific examples of the per-layer images for Layers 0 to 3. The image in the uppermost layer (i.e., Layer 0) is an image represented by the average value of each macroblock, and thus expresses the overall characteristics of the original image. The size of the Layer 0 image is inversely proportional to the macroblock size. If the macroblock size is taken to be N×N pixels, then the Layer 0 image has a fractional size 1/(N×N) with respect to the original image.

The images in the intermediate layers express scaled edge characteristics. Each lower layer yields an image containing more detailed edge characteristics. Depending on the macroblock division method, a plurality of layer images having different sizes larger than that of the thumbnail image may be obtained.

The image in the lowermost layer is an image expressing texture characteristics, with the average values and edge characteristics of the original image having been subtracted therefrom. The image in the lowermost layer is the same size as the original image.

It should be appreciated that the per-layer images shown in FIG. 8 have been scaled to the same size as the original image.

FIG. 9 illustrates the encoding principle of the present embodiment. In the present embodiment, an original image is separated into layers, and the image in a respective layer is encoded using an encoding scheme suitable for that particular layer. Meanwhile, the image in the uppermost layer obtained from the original image is an image that best expresses the characteristics of the original image, and for this reason the image is treated as a thumbnail image and is not encoded.

In the intermediate layers, encoding schemes are used whereby edges are efficiently expressed. For example, encoding schemes such as ADRC or edge direction coding may be used. The amount of information used to express each layer is allocated such that the original image area represented by a single pixel upon decoding increases with higher layers.

In the lowermost layer, an encoding scheme is used whereby texture characteristics are expressed. For example, encoding schemes such as vector quantization or a co-occurrence matrix may be used.

When a high compression ratio is desired, entropy coding may be suitably applied to the above coding to further decrease redundancy.

In this way, by encoding using a scheme that depends on the images in respective layers, encoding efficiency is increased. Moreover, encoding schemes suited to searching may also be implemented, thereby enabling rapid searching.

Figure 11:
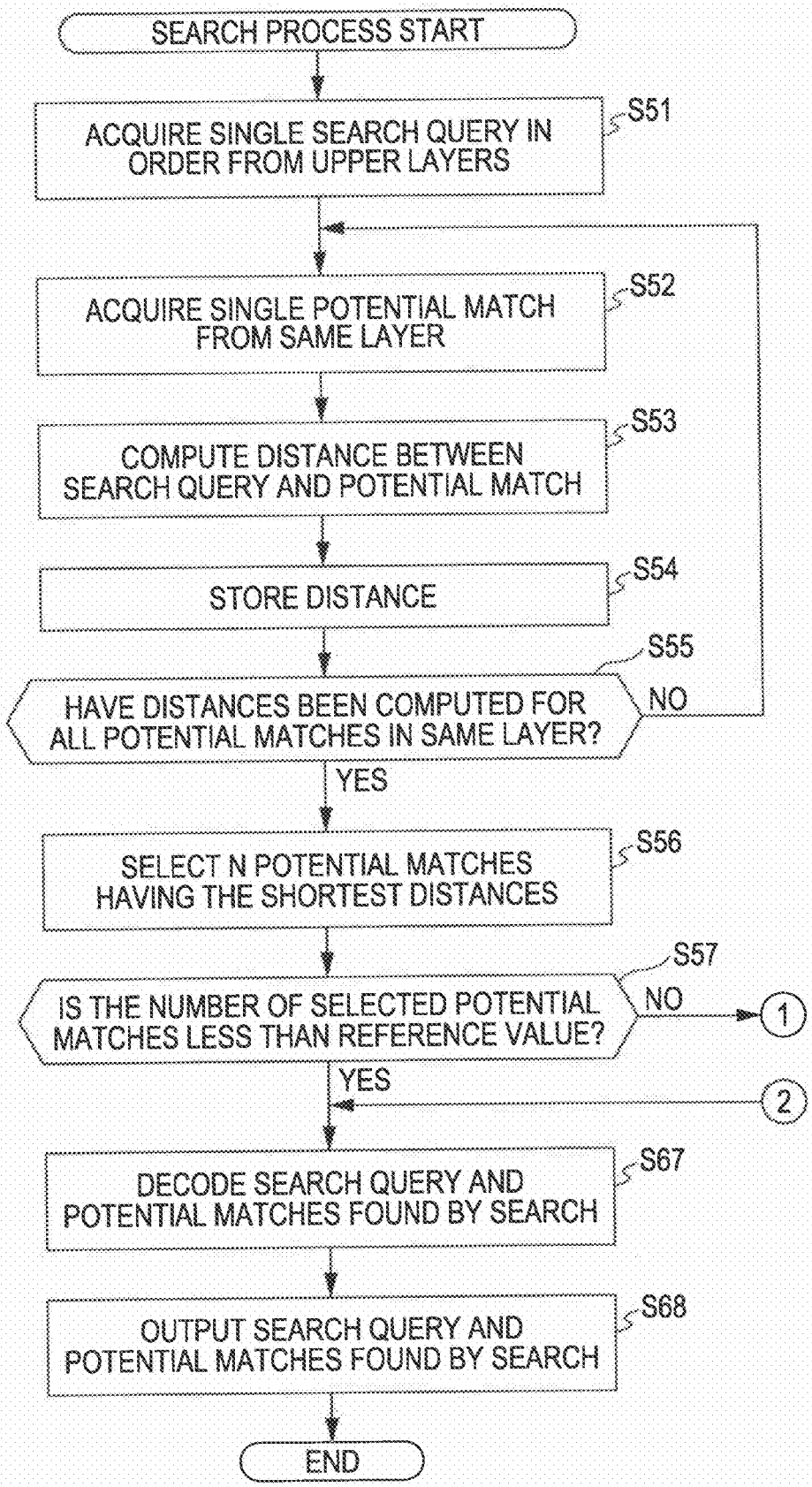
FIG. 11 is a flowchart explaining a search process.
Figure 12:
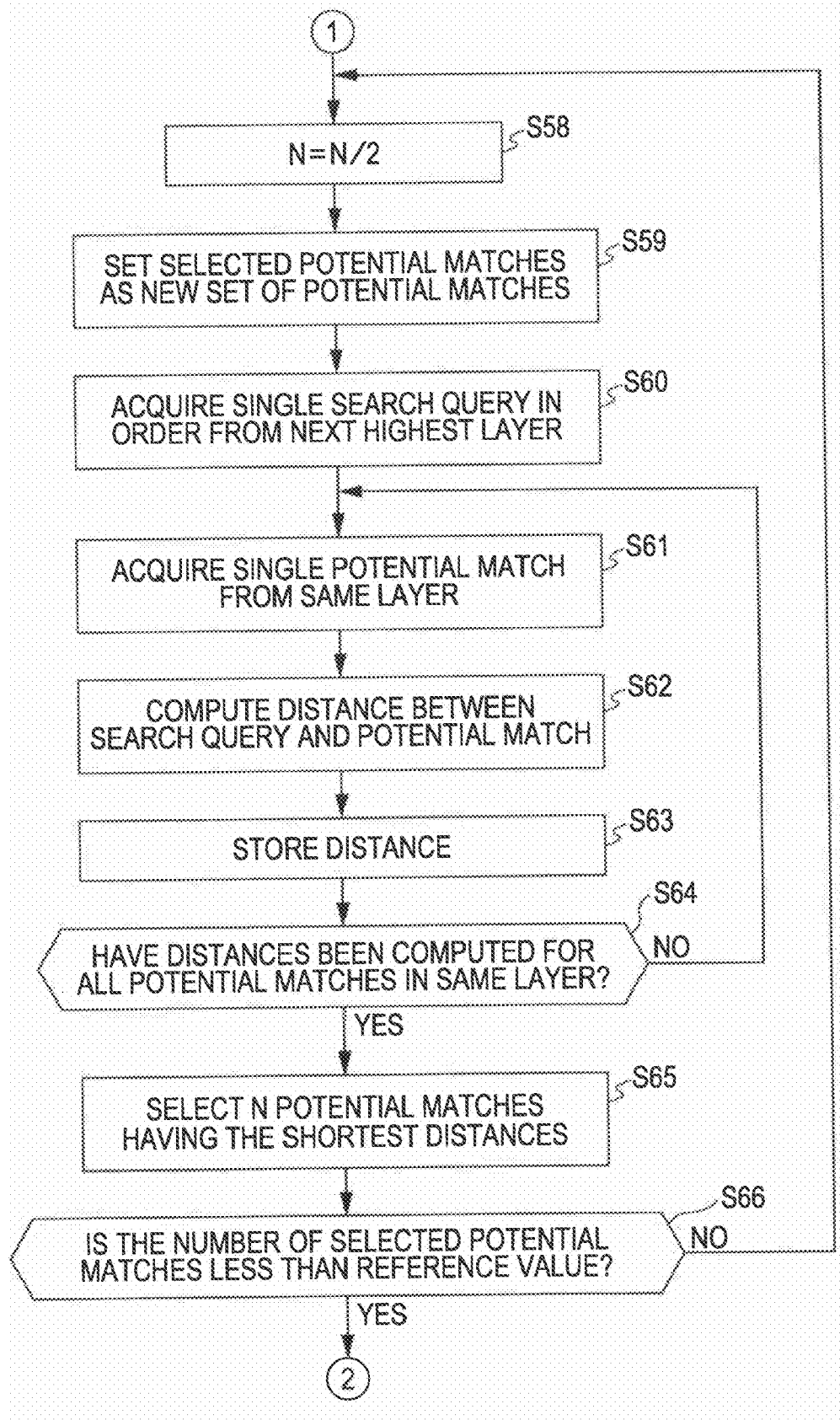
FIG. 12 is a flowchart explaining a search process.

A search process will now be described with reference to the flowcharts shown in FIGS. 11 and 12. In order to conduct this process, the comparing unit 42 has a functional configuration like that shown in FIG. 10.

More specifically, the comparing unit 42 includes a distance computing unit 91, a memory unit 92, a judgment unit 93, a selection unit 94, and a configuration unit 95.

The distance computing unit 91 computes the distance between a search query image and a potential match image. The memory unit 92 stores the computed distance. The judgment unit 93 makes various judgments. The selection unit 94 selects particular potential match images. The configuration unit 95 configures variables and potential matches.

A search process conducted by the information searching apparatus 12 will now be described with reference to the flowcharts shown in FIGS. 11 and 12. As described above, images for each layer are encoded and stored in the database 23. In the present search process, images set as potential matches and stored in the database 23 are searched in order to find images that resemble a user-specified image set as a search query and also stored in the database 23. Alternatively, when an non-encoded image is input for search, the input image may be encoded by the encoding unit 22 and subsequently treated as the search query similarly to the above case.

In step S51, the reading unit 41 acquires a single search query starting in order from the top layer on the basis of user instructions. In other words, since the image set as the search query is encoded and stored in layers, the uppermost layer thereof is retrieved from the database 23 in this case. Herein, the image of the uppermost layer is not encoded.

In step S52, the reading unit 41 acquires a single potential match from the same layer as that of the search query acquired in step S51. In the present case, the image in the uppermost layer from a single potential match is retrieved. The images set as potential matches may be images within a range determined on the basis of user-specified parameters such as genre and date/time, or all images registered in the database 23 may be set as potential matches.

In step S53, the distance computing unit 91 of the comparing unit 42 computes the distance between the search query and the potential match. More specifically, the distance is computed between the search query image acquired in step S51 and the potential match image acquired in step S52. In step S54, the memory unit 92 stores the computed distance. The distance is stored in order to select the potential match images having the shortest distances in the subsequent step S56.

In step S55, the judgment unit 93 determines whether or not the distances between the search query and all of the potential matches in the same layer have been computed. In the present case, the judgment unit 93 determines whether or not the distances between the Layer 0 image of the search query and the Layer 0 images of all the potential matches have been computed. If there exists a potential match whose distance has not yet been computed, the process returns to step S52, and another single potential match in the same layer is acquired.

In step 53, the distance between the search query image and the new potential match image is computed, and the computed distance is then stored in step S54. The above process is similarly repeated until the distances for all potential matches in the same layer have been computed.

When the distances between the search query and all of the potential matches in Layer 0 have been computed, the selection unit 94 selects N potential matches having shorter distances in step S56. The value of N may be an arbitrary value set by the user in advance. N images are then selected in order of shortest distance from among the distances that were stored in the process of step S54. It should be appreciated herein that increasingly smaller distance values mean that a given image resembles the search query image to correspondingly higher degree of relevance.

In step S57, the judgment unit 93 determines whether or not the number of selected potential matches is equal to or less than a reference value. The reference value may be a value set by the user in advance. If the number of images resembling the search query image that were selected in the process of step S56 is still larger than the reference value, then further searching is executed.

Consequently, in step S58, the configuration unit 95 sets the value of N to half its current value. In step S59, the configuration unit 95 sets the selected potential matches as the new set of potential matches. In other words, the N images that were selected in the process of step S56 are taken to be the set of potential match images for subsequent searching. Subsequently, in steps S59 to S65, a process similar to that of steps S51 to S56 above is executed with respect to the refined set of potential matches.

More specifically, in step S60, the reading unit 41 acquires a single search query from the next layer in order from the top. In other words, in the present case, Layer 1 is selected (being the next layer in order from the top after Layer 0), and the Layer 1 search query is retrieved from the database 23. Herein, the image in Layer 1 is encoded.

In step S61, the reading unit 41 acquires a single Layer 1 potential match from among the refined set of potential matches, Layer 1 being the same layer as that of the search query acquired in step S60. In step S62, the distance computing unit 91 computes the distance between the search query and the potential match. More specifically, the distance is computed between the search query image acquired in step S60 and the potential match image acquired in step S61. In step S63, the memory unit 92 stores the computed distance.

In step S64, the judgment unit 93 determines whether or not the distances for all potential matches in the same layer have been computed. In the present case, the judgment unit 93 determines whether or not the distances have been computed between the Layer 1 image of the search query and the Layer 1 images of all the potential matches in the refined set of potential matches. If there exists a potential match whose distance has not been computed, then the process returns to step S61, and another single Layer 1 potential match is acquired from among the refined set of potential matches.

In step S62, the distance is computed between the search query image selected in step S60 and the potential match image selected in step S61, and the resulting distance is then stored in step S63. The above process is similarly repeated until the distances have been computed for all Layer 1 potential matches in the refined set of potential matches.

When the distances have been computed for all Layer 1 potential matches in the refined set of potential matches, the selection unit 94 selects the N potential matches having the shortest distances in step S65. Herein, the value of N is set to be half the value of N that was used in step S56.

In step S66, the judgment unit 93 determines whether or not the number of selected potential matches is equal to or less than the reference value. If the number of images resembling the search query image that were selected in the process of step S65 is still larger than the reference value, then the process returns to step S58, and the value of N is again set to half its current value.

Subsequently, processes similar to that described above are executed for successively lower layers (Layer 2, Layer 3, etc.) until it is determined in step S66 that the number of selected potential match images has become less than the reference value.

Figures 13, 14:
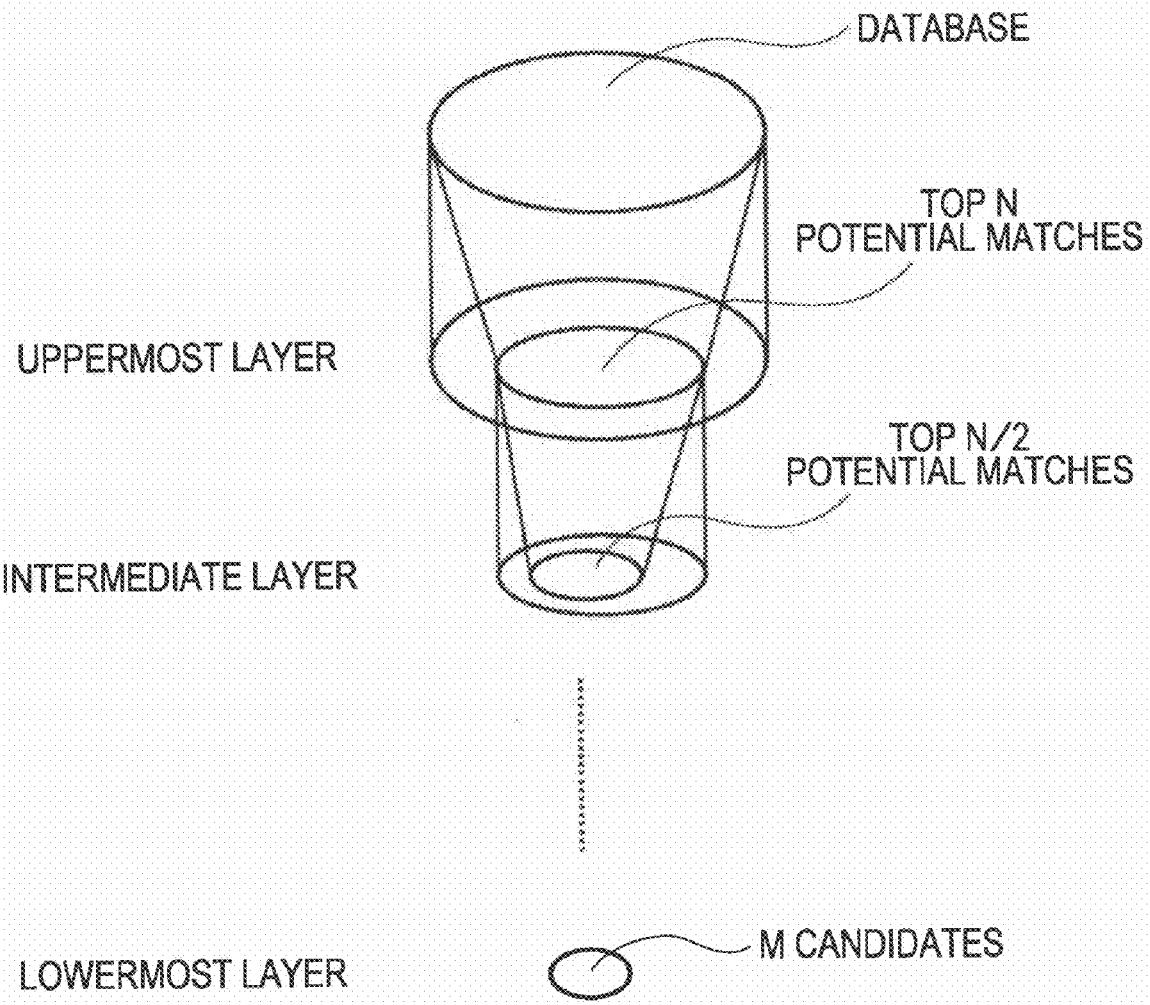
FIG. 13 is a diagram explaining per-layer search refinement.
FIG. 14 is a diagram explaining per-layer encoding.

As a result, searching is conducted in order from the upper layers and proceeding to the lower layers as shown in FIG. 13, with the number of selected potential match images being successively limited to N, N/2, N/4, N/8, etc. In the example shown in FIG. 13, the search process ultimately returns the M potential match images from the lowermost layer as candidate images that resemble the search query image. However, if the number of potential match images becomes equal to or less than the reference value at an earlier point in the search process, then the refinement process may be completed at one of the intermediate layers.

If it is determined in step S57 or S66 that the number of selected potential matches has become equal to or less than the reference value, then the decoding unit 43 decodes the search query and the potential matches in step S67. More specifically, the decoding unit 43 decodes the search query image, as well as a number of potential match images (being equal to or less than the reference value) that were determined to resemble the search query. Obviously, Layer 0 images are not decoded at this point, since Layer 0 images are non-encoded in the present case. An original image is obtained by enlarging the per-layer decoded images to the size of the original image, and subsequently adding together respective pixel values for all layer images.

In step S68, the output unit 44 outputs the search query as well as the potential matches found by search. More specifically, the output unit 44 displays the search query image and the potential match images that were decoded in step S67. The user is thus able to view the display and ultimately specify an image that resembles the search query.

The image distance computations conducted in steps S53 and S62 will now be described in further detail. As an example, consider the case shown in FIG. 14, wherein the image of the uppermost Layer 0 is taken to be a thumbnail image and thus non-encoded, the image of the subsequent Layer 1 is encoded using an edge direction scheme, and the image of the lowermost Layer 2 is encoded using a vector quantization scheme. Herein, inter-image distance is computed directly using the encoded layer images and without decoding.

Since Layer 0 images are non-encoded, the inter-image distance may be expressed as the sum of the squares of the differences between respective pixels.

In Layer 1, edge direction coding has been applied. For example, as shown in FIG. 15, an image may be encoded such that a code value of 0 is assigned to portions where there are no edges, a code value of 1 is assigned to portions where the edge direction in the image is horizontal, and respective code values of 2, 3, 4, 5, 6, 7, and 8 are assigned for every 22.5° increment in edge direction from the horizontal. In this case, edge direction coding is conducted as illustrated in FIG. 16.

Figure 8A:
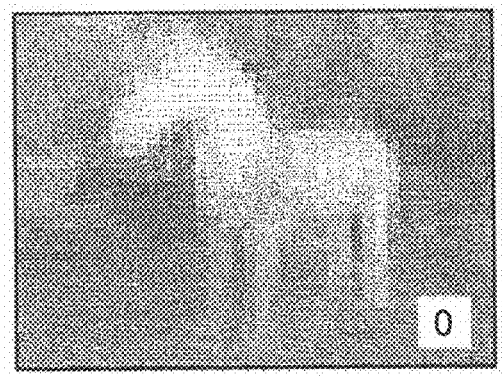
FIG. 8 is a diagram explaining a layered image.
Figure 8B:
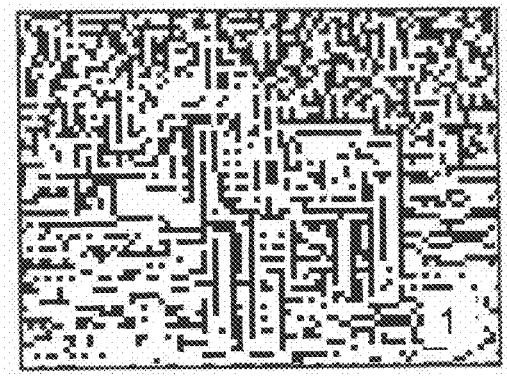
Figure 8C:
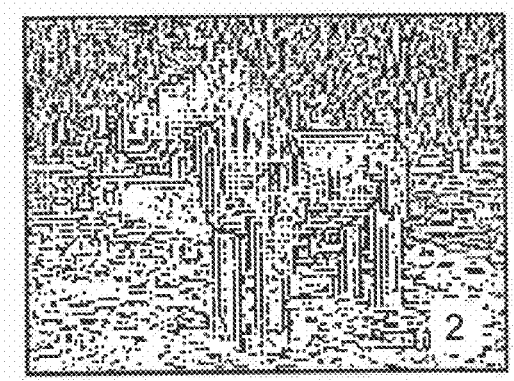
Figure 8D:

The image 101 in FIG. 16 represents the Layer 2 image shown in FIG. 8C. The block 102 is a coding block corresponding to a portion of the image 101, and is shown enlarged to the right of the image 101. The block 102 contains a horizontal edge extending to the right, another edge that extends from the right tip of the horizontal edge downward and to the right at 45° in an approximately stepwise manner, and another edge that extends from the right tip of the diagonal edge vertically downward. When the dominant edges are extracted from the block 102 by means of an edge detection filter, edges like those shown in the block 103 are detected.

More specifically, upon dividing the block 103 into a 2×2 array of sub-blocks, it can be seen that a horizontal edge exists in the upper-left sub-block, a 45° edge extending downward and to the right exists in the upper-right sub-block, and a vertical edge exists in the lower-right sub-block. Meanwhile, no edges are present in the lower-left sub-block. Consequently, upon encoding the block 103 in accordance with FIG. 15, the upper-left sub-block is expressed by the code value 1, the upper-right sub-block is expressed by the code value 3, the lower-left sub-block is expressed by the code value 0, and the lower-right sub-block is expressed by the code value 5, as shown in the block 104.

Figure 17A:
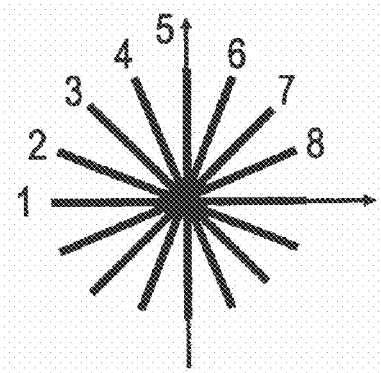
FIG. 17 is a diagram explaining distance measured in edge direction coding.

Edge encoding distance is computed as follows. As shown in FIG. 17A, since there exist code values from 1 to 8 that depend on the edge direction, the distance is fundamentally expressed using the difference between code values. If the magnitude the difference between two code values is between 0 and 4, an increase in magnitude corresponds to an increase in angle. However, if the magnitude of the difference between two code values is 5 or greater, an increase in magnitude corresponds to a decrease in angle. For example, the difference between the code value 7 and the code value 1 has a magnitude of 6, but the angle formed by the edge directions corresponding to the above code values is the same angle as that formed by the edge directions corresponding to the code value 3 and the code value 1, even though the difference between the latter code values has a magnitude of only 2.

Figure 17B:
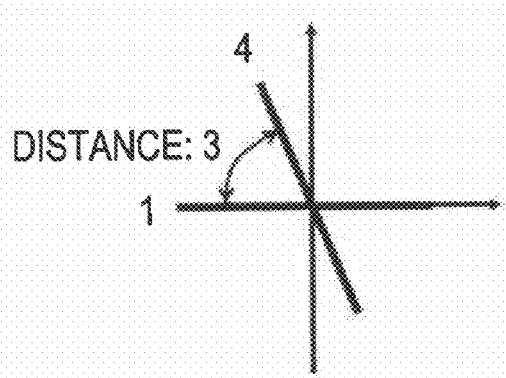

For this reason, when the magnitude of the difference between two edge direction code values is 4 or less, the distance is expressed using that magnitude. For example, the distance between the edge directions corresponding to the code value 4 and the code value 1 is 3 (=4−1), as illustrated in FIG. 17B.

However, when the magnitude is 5 or greater (i.e., from 5 to 7), then the distance between the edge directions is expressed according to the following equation.

$$\text{not}(D_1-D_2)+1 = \sim(b'D_1-b'D_2)+3b'001 \tag{1}$$

Figure 17C:
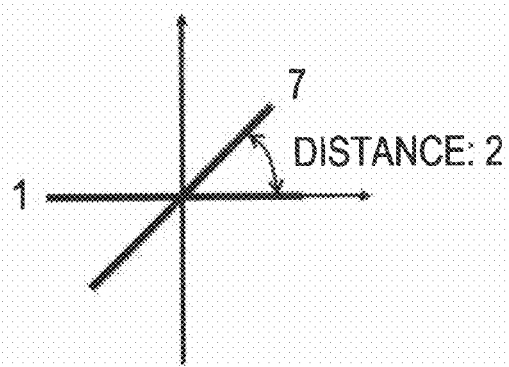

In the above Equation (1), $D_1$ and $D_2$ represent edge direction code values. The symbol $\sim$ represents the Verilog-AMS bitwise negation operator, and thus indicates an operation wherein a value expressed in binary is inverted, with the logical ones becoming logical zeroes, and logical zeroes becoming logical ones. In other words, Equation (1) expresses the two's complement of the value $(D_1-D_2)$. For example, the distance between the code value 7 and the code value 1 as illustrated in FIG. 17C becomes 2, as shown below.

$$\text{not}(7-1)+1 = \sim(3b'110-3b'001)+3b'001 \tag{2}$$
$$= 3b'001+3b'001 = 3b'010 = 1'd2$$

In Layer 2, the distance between the codebooks of respective images obtained by vector quantization may be used. The inter-codebook distance may be expressed as the sum of the differences between code words corresponding to a representative vector, or alternatively, the sum of the minimum differences between code words. In this case, since pattern positions are not considered, the distance can be thought of as a quantity expressing the difference in overall impression or texture between two images.

Furthermore, when computing the distance, image positions may be shifted to compute distances at various positions, with the final inter-image distance taken to be the minimum computed value.

Since an image is decomposed into layers and encoded on a per-layer basis, encoding for not only compression but also searching can be efficiently conducted. Moreover, since searches are conducted by directly using the per-layer coded information generated at the time of compression, it becomes possible to conduct rapid searching without executing processing to decode portions of the coded information to be searched.

Since respective layers express different characteristics of a given image, search results may vary according to the sequence whereby layers are selected for comparison. The user may specify the search order in order to conduct searches that focus on image composition, or searches that focus on image texture. The user may also issue instructions for conducting a search in order of the layers with the highest activity, for example.

In the latter case, the comparing unit 42 has a functional configuration as illustrated in FIG. 18. As shown in FIG. 18, the comparing unit 42 includes the components from the distance computing unit 91 to the configuration unit 95 shown in FIG. 10, as well as an activity computing unit 131. The activity computing unit 131 computes per-layer image activity.

Figure 20:
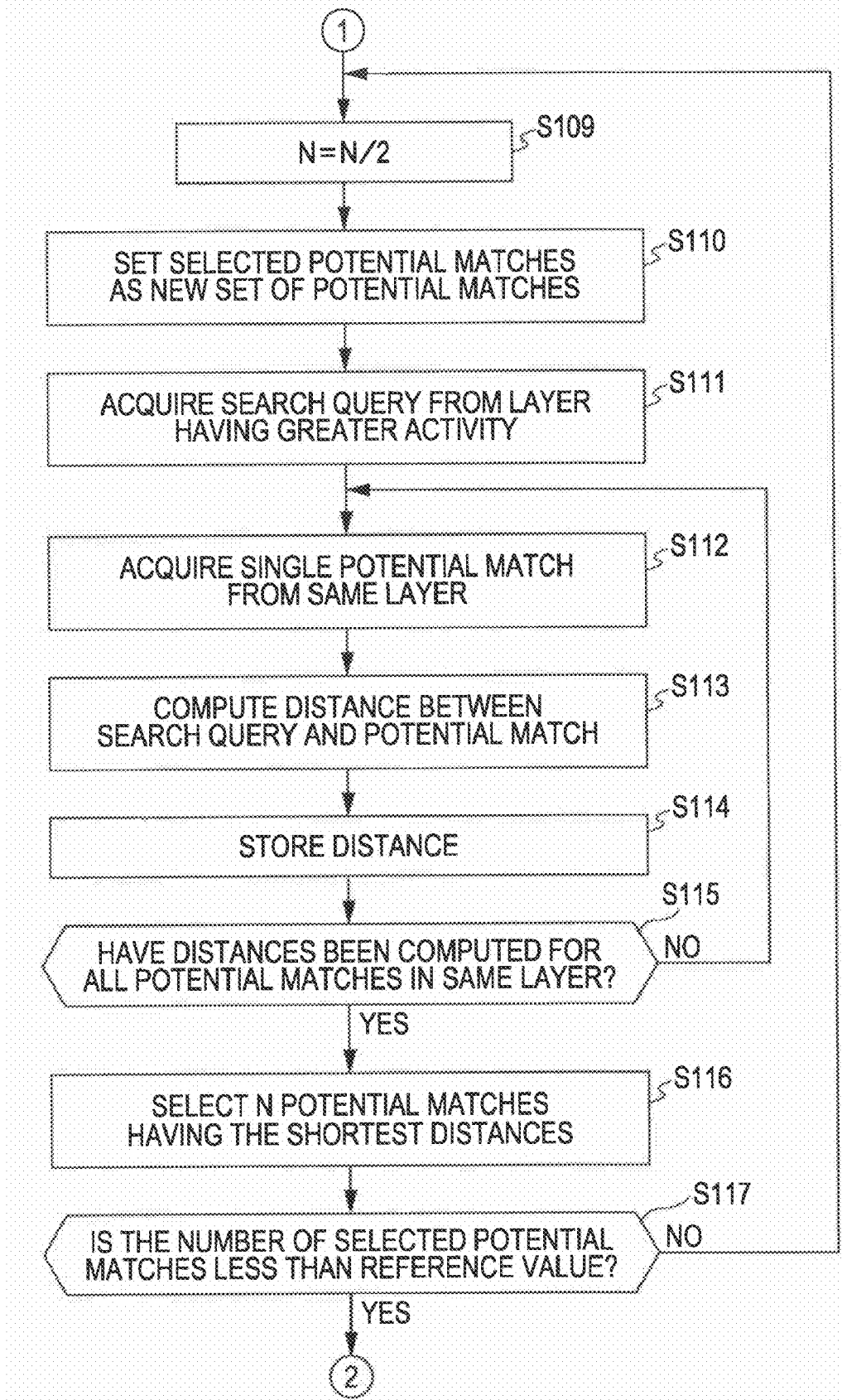
FIG. 20 is a flowchart explaining a search process.

A process for conducting a search wherein layers are compared in order of highest activity is shown by way of example in the flowcharts in FIGS. 19 and 20. In step S101, the activity computing unit 131 computes the per-layer activity of the search query.

The activity in the thumbnail image may be computed by solving for the sum of the squares of the difference values between adjacent pixels over the entire image, as expressed by way of example in the following equation. In the equation below, I represents the set of all pixel coordinates (x, y), while P(x, y) represents the pixel value at the given coordinates (x, y).

$$\sum_{x,y \in I} \sum_{i,j=-1}^{1} \{P(x+i, y+j) - P(x, y)\}^2 \quad (3)$$

Activity in edge direction coding may also be computed by solving for the sum of the squares of the difference values between adjacent pixels over the entire image, as expressed in the above Equation (3). Small difference values between adjacent pixels indicate a continuous edge, while large difference values indicate a discontinuous edge.

For images encoded by vector quantization, the code word activity may be simply taken to be the image activity. Code word activity may be expressed by the following equation, wherein quantization is conducted using an N-dimensional vector, the size of the codebook is taken to be N, the ith code vector is $CW_i$, the number of dimensions in each code word is M, and the jth element of a code word is CW(j).

$$\sum_{i=1}^{N} \sum_{j=1}^{M} CW_i(j)^2 \quad (4)$$

In step S102, the reading unit 41 acquires a single search query from a layer in order of highest activity. In so doing, the layer image with the largest activity value as computed in step S101 is retrieved from among the layers constituting the search query image stored in the database 23.

In step S103, the reading unit 41 acquires a single potential match from the same layer as above. More specifically, a potential match image is retrieved from the database 23 that is from the same layer as that of the search query image that was retrieved in step S102. In step S104, the distance computing unit 91 computes the distance between the search query image and the potential match image.

Subsequently, in steps S105 to S110, a process is conducted similar to that conducted from step S54 in FIG. 11 to step S59 in FIG. 12. More specifically, N potential match images having shorter distances in the same layer are selected, and those N potential matches are taken to be the new set of potential matches. Subsequently, the variable N that determines the number of potential matches to be selected next is set to half its current value.

In step S111, the reading unit 41 acquires a search query from a layer in order of highest activity. In the present case, a search query is retrieved from the database 23 from the layer with the next highest activity following the layer that was retrieved in step S102.

In step S112, the reading unit 41 acquires a single potential match from the same layer as above. More specifically, a potential match image is retrieved from the database 23 that is from the same layer as that of the search query image that was retrieved in step S110. In step S113, the distance computing unit 91 computes the distance between the search query image and the potential match image.

Subsequently, in steps S114 to S117, a process is conducted similar to that conducted from steps S63 to S66 in FIG. 12. More specifically, N potential match images having short distances in the same layer are selected, and those N potential matches are taken to be the new set of potential matches. The number N in this case is set to half the value of the number N that was used for the previous layer. Consequently, as the process proceeds to lower layers, the number of potential matches becomes smaller.

If it is determined in step S108 or step S117 that the number of selected potential matches has become equal to or less than a reference value, then the decoding unit 43 decodes the search query and the potential matches in step S118. More specifically, the decoding unit 43 decodes the search query image, as well as a number of potential match images (being equal to or less than the reference value) that were determined to resemble the search query. Obviously, Layer 0 images are not decoded at this point, since Layer 0 images are non-encoded in the present case.

In step S119, the output unit 44 outputs the search query as well as the potential matches found by search. More specifically, the output unit 44 displays the search query image and the potential match images that were decoded in step S118. The user is thus able to view the display and ultimately specify an image that resembles the search query.

By thus searching images in order of the layers with the highest activity, a desired image (depicting a complex scene, for example) can be rapidly and reliably found by search.

In the embodiments respectively described above with reference to FIGS. 11 and 12 as well as FIGS. 19 and 20, the set of candidate images resembling the search query is refined on a per-layer basis. However, candidates may also be determined by making a comprehensive judgment regarding the distances for all layers.

Figure 10:
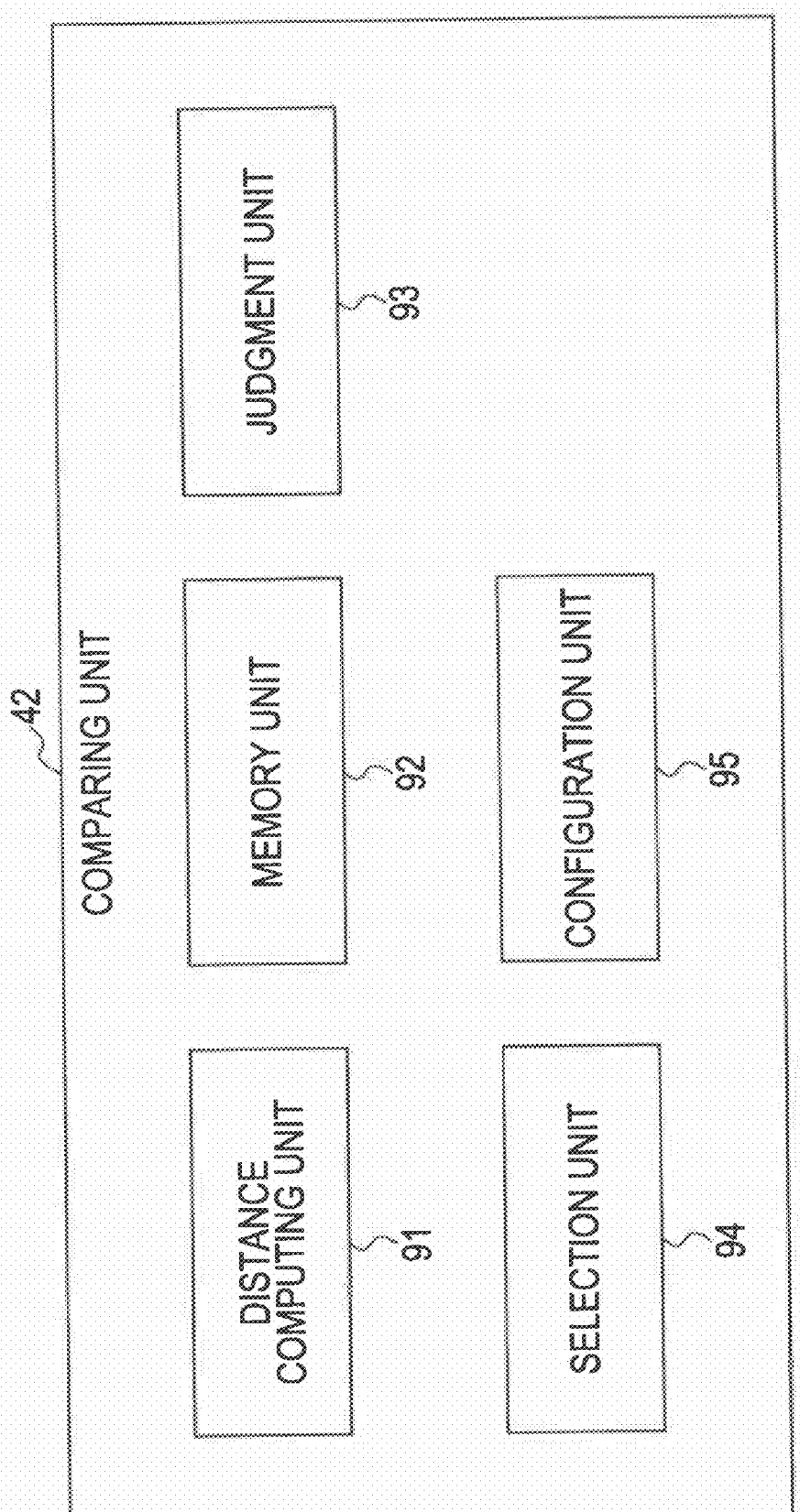
FIG. 10 is a block diagram illustrating the functional configuration of a comparing unit.

In this case, the comparing unit 42 includes the distance computing unit 91, the memory unit 92, the judgment unit 93, and the selection unit 94 shown in FIG. 10, as well as a ranking unit 151 and a score calculation unit 152, as shown in FIG. 21. The configuration unit 95 has been omitted herein.

A search process for the above case will now be described with reference to the flowchart in FIG. 22.

In step S151, the reading unit 41 acquires a single search query starting in order from an upper layer on the basis of user instructions. In the present case, a search query from the uppermost layer is retrieved from the database 23.

In step S152, the reading unit 41 acquires a potential match from the same layer as that of the search query that was acquired in step S151. In the present case, a single potential match image from the uppermost layer is retrieved.

In step S153, the distance computing unit 91 computes the distance between the search query and the potential match. More specifically, the distance computing unit 91 computes the distance between the search query image acquired in step S151 and the potential match image acquired in step S152. In step S154, the memory unit 92 stores the computed distance.

In step S155, the judgment unit 93 determines whether or not the distances have been computed for all potential matches in the same layer. In the present case, the judgment unit 93 determines whether or not the distances between the Layer 0 image of the search query and the Layer 0 images of all the potential matches have been computed. If there exists a potential match whose distance has not yet been computed, the process returns to step S152, and another single potential match in the same layer is acquired.

In step 153, the distance between the search query image and the new potential match image is computed, and the computed distance is then stored in step S154. The above process is similarly repeated until the distances for all potential matches in the same layer have been computed.

When it is determined in step S155 that the distances between the search query and all of the potential matches in Layer 0 have been computed, the ranking unit 151 subsequently ranks the potential matches in order of shortest distance in step S156. In step S157, the score calculation unit 152 assigns scores to the first N potential matches in the order determined by the ranking unit 151. For example, scores may be assigned as follows.

| Rank 1 | 100 |
| Rank 2 | 90 |
| Rank 3 | 80 |
| Rank 4 | 70 |
| ... | |

In step S158, the judgment unit 93 determines whether or not scores have been computed for potential matches in all layers. If there exist potential matches in layers where scores have yet not been computed, then the process returns to step S151, and the processing subsequent thereto is repeated. In this way, scores are assigned to potential match images in all layers.

If it is determined in step S158 that potential match scores have been computed in all layers, then in step S159, the score calculation unit 152 respectively adds together the scores for each individual potential match across all layers. In so doing, a single score becomes associated with each potential match.

In step S160, the selection unit 94 selects a desired number of potential matches in order of largest score as computed in step S159. The larger the score for a given potential match image, the more closely that potential match image resembles the search query image.

In step S161, the decoding unit 43 decodes the search query and the potential matches. More specifically, the decoding unit 43 decodes the search query image, as well as the potential match images that were selected in step S160. Obviously, Layer 0 images are not decoded at this point, since Layer 0 images are non-encoded in the present case.

In step S162, the output unit 44 outputs the search query as well as the potential matches found by search. More specifically, the output unit 44 displays the search query image and the potential match images that were decoded in step S161. The user is thus able to view the display and ultimately specify an image that resembles the search query.

In this way, according to the process shown in FIG. 22, scores are computed for all layers, and thus it becomes possible to conduct reliable searches with little chance of missed search results.

A per-layer selection method and a candidate selection method may also be combined. In so doing, it becomes possible to conduct searches in accordance with the user's intended usage.

Although the foregoing describes the searching of images, the present invention may also be applied the searching of audio or other information.

The series of processes described above may be executed by means of hardware or software. In the case where the series of processes is to be executed by means of software, then a program constituting such software may be installed from a program recording medium onto a computer with specialized, built-in hardware, or alternatively, onto a device such as a general-purpose computer capable of executing a variety of functions by installing various programs thereon.

The program recording medium that stores a computer-executable program to be installed on a computer may be one of removable package media such as magnetic disk (including flexible disks), optical discs (including CD-ROMs (Compact Disc-Read Only Memory), DVDs (Digital Versatile Disc), or magneto-optical disks), or semiconductor memory. Alternatively, the program recording medium may be realized by memory such as ROM or a hard disk that temporarily or permanently stores the program. The storing of the program in the program recording medium may also be conducted with the use of a wired or wireless communications medium such as a local area network, the Internet, or a digital satellite broadcast, and via an interface such as a router or modem as appropriate.

It should be appreciated that, in the present specification, the steps defining the action of a program are not limited to the realization of a process conducted in a time series according to the sequence described in the foregoing, but also include the realization of a process wherein the above steps are executed individually or in parallel in a non-timewise manner.

In addition, in the present specification, a system refers to the entirety of an apparatus made up of a plurality of component equipment.

Furthermore, it should be appreciated that embodiments of the present invention are not limited to the embodiments described in the foregoing, and that various modifications are possible without departing from the scope and spirit of the present invention.

What is claimed is:

1. An information encoding apparatus, comprising:
    an input unit configured to input information to be stored;
    an encoding unit configured to encode the input information in layers using a different encoding scheme for each layer, without encoding an uppermost layer of the information, and to generate a thumbnail image at the uppermost layer of the information; and
    a database configured to store per-layer encoded information.

2. The information encoding apparatus according to claim 1, wherein the encoding unit is configured to
divide the information into macroblocks,
compute an average value for each sub-block constituting a particular macroblock,
compute an average value differential block by subtracting the computed average values from the corresponding macroblock, and
encode the resulting average value differential block.

3. The information encoding apparatus according to claim 1, wherein
the information is image information.

4. The information encoding apparatus according to claim 1, wherein
the encoding unit is configured to generate the thumbnail image at the uppermost layer of the information, without generating another thumbnail image at another layer of the information, and configured to encode a first layer of the layers of the information using an edge direction coding scheme, and a second layer of the layers of the information using an Adaptive Dynamic Range Coding scheme.

5. An information encoding method, comprising:
inputting information to be stored;
encoding the input information in layers using a different encoding scheme for each layer, without encoding an uppermost layer of the information, and generating a thumbnail image at the uppermost layer of the information; and
storing the per-layer encoded information.

6. A non-transitory computer-readable storage medium including computer executable instructions, wherein the instructions, when executed by a computer, cause the computer to perform a method, the method comprising:
inputting information to be stored;
encoding the input information in layers using a different encoding scheme for each layer, without encoding an uppermost layer of the information, and generating a thumbnail image at the uppermost layer of the information; and
storing the per-layer encoded information.

7. An information encoding apparatus, comprising:
a dividing unit configured to divide a macroblock into a plurality of sub-blocks having a predetermined size, the macroblock being one of a plurality of macroblocks obtained by dividing original information thereinto;
an average value computing unit configured to compute an average value for each sub-block constituting a particular macroblock;
an average value differential block computing unit configured to compute an average value differential block by subtracting the computed average values from the corresponding macroblock; and
an encoding unit configured to encode average value differential blocks for each of a plurality of layers computed by repeatedly dividing each macroblock into smaller sub-blocks, the encoding unit configured to encode the average value differential blocks for each of a plurality of layers using a different encoding scheme for each layer, without encoding the average value differential blocks of an uppermost layer of the information, and the uppermost layer of the information corresponding to a thumbnail image.

8. The information encoding apparatus according to claim 7, wherein
the average value computing unit is configured to additionally compute an average value for each of the plurality of macroblocks themselves, and
the encoding unit is configured to take the average value information for the macroblocks themselves as the information in the uppermost layer without encoding the average value information.

9. The information encoding apparatus according to claim 8, further comprising:
a database that stores the per-layer information.

10. An information encoding method, comprising:
dividing a macroblock into a plurality of sub-blocks having a predetermined size, the macroblock being one of a plurality of macroblocks obtained by dividing original information thereinto;
computing an average value for each sub-block constituting a particular macroblock;
computing an average value differential block by subtracting the computed average values from the corresponding macroblock; and
encoding average value differential blocks for each of a plurality of layers computed by repeatedly dividing each macroblock into smaller sub-blocks, the encoding encoding the average value differential blocks for each of a plurality of layers using a different encoding scheme for each layer, without encoding the average value differential blocks of an uppermost layer of the information, and the uppermost layer of the information corresponding to a thumbnail image.

11. A non-transitory computer-readable storage medium including computer executable instructions, wherein the instructions, when executed by a computer, cause the computer to perform a method, the method comprising:
dividing a macroblock into a plurality of sub-blocks having a predetermined size, the macroblock being one of a plurality of macroblocks obtained by dividing original information thereinto;
computing an average value for each sub-block constituting a particular macroblock;
computing an average value differential block by subtracting the computed average values from the corresponding macroblock; and
encoding average value differential blocks for each of a plurality of layers computed by repeatedly dividing each macroblock into smaller sub-blocks, the encoding encoding the average value differential blocks for each of a plurality of layers using a different encoding scheme for each layer, without encoding the average value differential blocks of an uppermost layer of the information, and the uppermost layer of the information corresponding to a thumbnail image.

12. An information searching apparatus, comprising:
an acquiring unit configured to acquire information that has been encoded in layers in order from the upper layers thereof, each of the layers being encoded with a different encoding scheme, and an uppermost layer of the information corresponding to a thumbnail image and not being encoded;
a comparing unit configured to compare the encoded information for an acquired search query to the encoded information for potential matches on a per-layer basis;
a decoding unit configured to, on the basis of the comparison results, decode the information for the potential matches that resemble the search query; and
an output unit configured to output the decoded information for the potential matches that resemble the search query.

13. The information searching apparatus according to claim 12, wherein the comparing unit is configured to compute the distance between the encoded information for a search query and the encoded information for a potential match.

14. The information searching apparatus according to claim 13, wherein the comparing unit is configured to compare the search query information to potential match information at successively lower layers, wherein the potential matches being compared to the search query information have been determined in an upper layer to have a shorter distance to the search query.

15. The information searching apparatus according to claim 12, wherein the comparing unit is configured to conduct comparisons on a per-layer basis in order of the layers having the greatest amount activity in the search query.

16. The information searching apparatus according to claim 12, wherein the comparing unit is configured to search for potential match information that resembles the search query on the basis of scores assigned in each layer according to the distance with respect to the search query information in that layer.

17. An information searching method, comprising:
acquiring information that has been encoded in layers in order from the upper layers thereof, each of the layers being encoded with a different encoding scheme, and an uppermost layer of the information corresponding to a thumbnail image and not being encoded;
comparing the encoded information for an acquired search query to the encoded information for potential matches on a per-layer basis;
on the basis of the comparison result, decoding the potential match information for the potential matches that resemble the search query; and
outputting the decoded information for the potential matches that resemble the search query.

18. A non-transitory computer-readable storage medium including computer executable instructions, wherein the instructions, when executed by a computer, cause the computer to perform a method, the method comprising:
acquiring information that has been encoded in layers in order from the upper layers thereof, each of the layers being encoded with a different encoding scheme, and an uppermost layer of the information corresponding to a thumbnail image and not being encoded;
comparing the encoded information for an acquired search query to the encoded information for potential matches on a per-layer basis;
on the basis of the comparison result, decoding the potential match information for the potential matches that resemble the search query; and
outputting the decoded information for the potential matches that resemble the search query.

19. An information searching system, comprising:
a dividing unit configured to divide a macroblock into a plurality of sub-blocks having a predetermined size, the macroblock being one of a plurality of macroblocks obtained by dividing original information thereinto;
an average value computing unit configured to compute an average value for each sub-block constituting a particular macroblock;
an average value differential block computing unit configured to compute an average value differential block by subtracting the computed average values from the corresponding macroblock;
an encoding unit configured to encode average value differential blocks for each of a plurality of layers computed by repeatedly dividing each macroblock into smaller sub-blocks, the encoding unit configured to encode the average value differential blocks for each of a plurality of layers using a different encoding scheme for each layer, without encoding the average value differential blocks of an uppermost layer of the information, and the uppermost layer of the information corresponding to a thumbnail image;
an acquiring unit configured to acquire information that has been thus encoded in layers in order from the upper layers thereof;
a comparing unit configured to compare the encoded information for an acquired search query to the encoded information for potential matches on a per-layer basis;
a decoding unit configured to, on the basis of the comparison result, decode the information for the potential matches that resemble the search query; and
an output unit configured to output the decoded information for the potential matches that resemble the search query.

20. An information searching method, comprising:
dividing a macroblock into a plurality of sub-blocks having a predetermined size, the macroblock being one of a plurality of macroblocks obtained by dividing original information thereinto;
computing an average value for each sub-block constituting a particular macroblock;
computing an average value differential block by subtracting the computed average values from the corresponding macroblock;
encoding average value differential blocks for each of a plurality of layers computed by repeatedly dividing each macroblock into smaller sub-blocks, the encoding encoding the average value differential blocks for each of a plurality of layers using a different encoding scheme for each layer, without encoding the average value differential blocks of an uppermost layer of the information, and the uppermost layer of the information corresponding to a thumbnail image;
acquiring information that has been thus encoded in layers in order from the upper layers thereof;
comparing the encoded information for an acquired search query to the encoded information for potential matches on a per-layer basis;
on the basis of the comparison result, decoding the information for the potential matches that resemble the search query; and
outputting the decoded information for the potential matches that resemble the search query.

21. A non-transitory computer-readable storage medium including computer executable instructions, wherein the instructions, when executed by a computer, cause the computer to perform a method, the method comprising:
dividing a macroblock into a plurality of sub-blocks having a predetermined size, the macroblock being one of a plurality of macroblocks obtained by dividing original information thereinto;
computing an average value for each sub-block constituting a particular macroblock;
computing an average value differential block by subtracting the computed average values from the corresponding macroblock;
encoding average value differential blocks for each of a plurality of layers computed by repeatedly dividing each macroblock into smaller sub-blocks, the encoding encoding the average value differential blocks for each of a plurality of layers using a different encoding scheme for each layer, without encoding the average value differential blocks of an uppermost layer of the information, and the uppermost layer of the information corresponding to a thumbnail image;

acquiring information that has been thus encoded in layers in order from the upper layers thereof;

comparing the encoded information for an acquired search query to the encoded information for potential matches on a per-layer basis;

on the basis of the comparison result, decoding the information for the potential matches that resemble the search query; and outputting the decoded information for the potential matches that resemble the search query.

* * * * *